United States Patent
Aloisio

(10) Patent No.: US 11,648,674 B2
(45) Date of Patent: May 16, 2023

(54) SYSTEM AND METHOD FOR ROBOTIC BIN PICKING USING ADVANCED SCANNING TECHNIQUES

(71) Applicant: Teradyne, Inc., North Reading, MA (US)

(72) Inventor: Christopher Thomas Aloisio, Framingham, MA (US)

(73) Assignee: Teradyne, Inc., North Reading, MA (US)

( * ) Notice: Subject to any disclaimer, the term of this patent is extended or adjusted under 35 U.S.C. 154(b) by 900 days.

(21) Appl. No.: 16/520,007

(22) Filed: Jul. 23, 2019

(65) Prior Publication Data
US 2021/0023710 A1  Jan. 28, 2021

(51) Int. Cl.
*B25J 9/16* (2006.01)
*B25J 13/00* (2006.01)
*B25J 13/06* (2006.01)

(52) U.S. Cl.
CPC ........... *B25J 9/1679* (2013.01); *B25J 9/1628* (2013.01); *B25J 13/06* (2013.01); *B25J 13/006* (2013.01)

(58) Field of Classification Search
CPC ........ B25J 9/1679; B25J 9/1628; B25J 13/06; B25J 13/006
See application file for complete search history.

(56) References Cited

U.S. PATENT DOCUMENTS

| | | | |
|---|---|---|---|
| 2010/0092032 A1 | 4/2010 | Boca | |
| 2011/0010009 A1* | 1/2011 | Saito | B25J 9/1612 703/13 |
| 2011/0301741 A1 | 12/2011 | Kayani et al. | |
| 2012/0277909 A1* | 11/2012 | Ouchi | B25J 9/1661 700/254 |
| 2013/0166061 A1* | 6/2013 | Yamamoto | B25J 9/1669 700/214 |
| 2014/0012416 A1* | 1/2014 | Negishi | B25J 9/1607 700/251 |
| 2014/0277694 A1* | 9/2014 | Ichimaru | B25J 9/1612 700/218 |
| 2015/0042784 A1* | 2/2015 | Yamamoto | G06T 1/0007 348/94 |
| 2016/0001445 A1* | 1/2016 | Setsuda | G05B 19/425 700/260 |
| 2016/0129594 A1* | 5/2016 | Telling | G06K 7/10376 700/255 |
| 2017/0028562 A1* | 2/2017 | Yamazaki | B25J 9/163 |
| 2018/0126553 A1* | 5/2018 | Corkum | B25J 9/1697 |
| 2018/0250823 A1* | 9/2018 | Shimodaira | B25J 9/1612 |
| 2019/0291282 A1* | 9/2019 | Marchese | B25J 9/1605 |

OTHER PUBLICATIONS

Extended European Search Report issued in EP 20843175.9 dated Aug. 17, 2022, 41 pages.

* cited by examiner

*Primary Examiner* — Kira Nguyen
(74) *Attorney, Agent, or Firm* — Mark H. Whittenberger; Holland & Knight LLP

(57) ABSTRACT

A method and system for programming picking and placing of a workpiece is provided. Embodiments may include associating a workpiece with an end effector that is attached to a robot and scanning the workpiece while the workpiece is associated with the end effector. Embodiments may also include determining a pose of the workpiece relative to the robot, based upon, at least in part, the scanning.

16 Claims, 26 Drawing Sheets

SYSTEM AND METHOD FOR ROBOTIC BIN PICKING USING ADVANCED SCANNING TECHNIQUES

FIELD OF THE INVENTION

The invention generally relates to robotics and, more specifically, to a system and method for robotic bin picking.

BACKGROUND

Certain forms of manual labor such as unloading a bin one workpiece at a time into a machine, bulk parts sorting, and order fulfillment are labor-intensive. These jobs are often dangerous if the workpieces or operations are heavy, sharp, or otherwise hazardous. In an effort to counteract these issues, bin picking robots have been tackling these tedious jobs. However, robotic bin picking is a particularly difficult task to master as the amount of accuracy and precision required is often beyond the capabilities of the system. Bin picking generally includes finding a part in a bin, picking it up, moving it to a destination, and then putting it down. Traditional robot programming generally involves specifying a series of robot poses programmatically. "Programming by example", "lead-through programming," or "teach-in programming" traditionally means leading the robot through a series of poses.

SUMMARY

In one implementation, a method for programming picking and placing of a workpiece is provided. The method may include associating a workpiece with an end effector that is attached to a robot and scanning the workpiece while the workpiece is associated with the end effector. The method may further include determining a pose of the workpiece relative to the robot, based upon, at least in part, the scanning.

One or more of the following features may be included. The method may include picking up the workpiece via the robot, wherein picking up the workpiece includes specifying one or more poses of the robot relative to the pose of the workpiece. The method may further include placing the workpiece, wherein placing the workpiece includes determining a robot pose and inferring the pose of the workpiece from the robot pose. The method may also include placing the workpiece, wherein placing the workpiece includes specifying one or more poses of the robot relative to the pose of the workpiece. The method may further include displaying, at a graphical user interface, the pose of the workpiece relative to the robot to allow for visual verification. In some embodiments, scanning and determining may occur while the robot is in a fixed position. The method may further include allowing a user to adjust the pose of the workpiece relative to the robot by entering one or more coordinates. The method may also include displaying an adjusted pose of the workpiece at a graphical user interface for verification.

In another implementation, a system for programming picking and placing of a workpiece is provided. The system may include an end effector that is attached to a robot and configured to have a workpiece associated therewith. The system may also include a scanner configured to scan the workpiece while the workpiece is associated with the end effector. The system may further include a computing device configured to determine a pose of the workpiece relative to the robot, based upon, at least in part, the scanning.

One or more of the following features may be included. The robot may be configured to pick up the workpiece, wherein picking up the workpiece includes specifying one or more poses of the robot relative to the pose of the workpiece. The robot may be configured to place the workpiece, wherein placing the workpiece includes determining a robot pose and inferring the pose of the workpiece from the robot pose. The robot may be configured to place the workpiece, wherein placing the workpiece includes specifying one or more poses of the robot relative to the pose of the workpiece. The computing device may be configured to display, at a graphical user interface, the pose of the workpiece relative to the robot to allow for visual verification. Scanning and determining may occur while the robot is in a fixed position. The graphical user interface may be configured to allow a user to adjust the pose of the workpiece relative to the robot by entering one or more coordinates. The graphical user interface may be configured to display an adjusted pose of the workpiece at the graphical user interface for verification.

The details of one or more implementations are set forth in the accompanying drawings and the description below. Other features and advantages will become apparent from the description, the drawings, and the claims.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of the present disclosure are directed towards a system and method for robotic bin picking. Accordingly, the bin picking methodologies included herein may allow a robot to work with a scanning system to identify parts in a bin, pick parts from the bin, and place the picked parts at a designated location. In contrast with the traditional robot programming examples discussed above, embodiments of the robotic bin picking process described herein are configured to focus on the workpiece's relationship to the robot end effector, as opposed to the robot alone. The workpiece could be anywhere in the bin and the final workpiece placement might be effected using many different robot poses.

Embodiments of the subject application may include concepts from U.S. Pat. Nos. 6,757,587, 7,680,300, 8,301,421, 8,408,918, 8,428,781, 9,357,708, U.S. Publication No. 2015/0199458, U.S. Publication No. 2016/0321381, U. S. Publication No. 2018/0060459, and U.S. patent application Ser. Nos. 16/453,197 and 16/378,343 the entire contents of each are incorporated herein by reference in their entirety.

Figure 1:
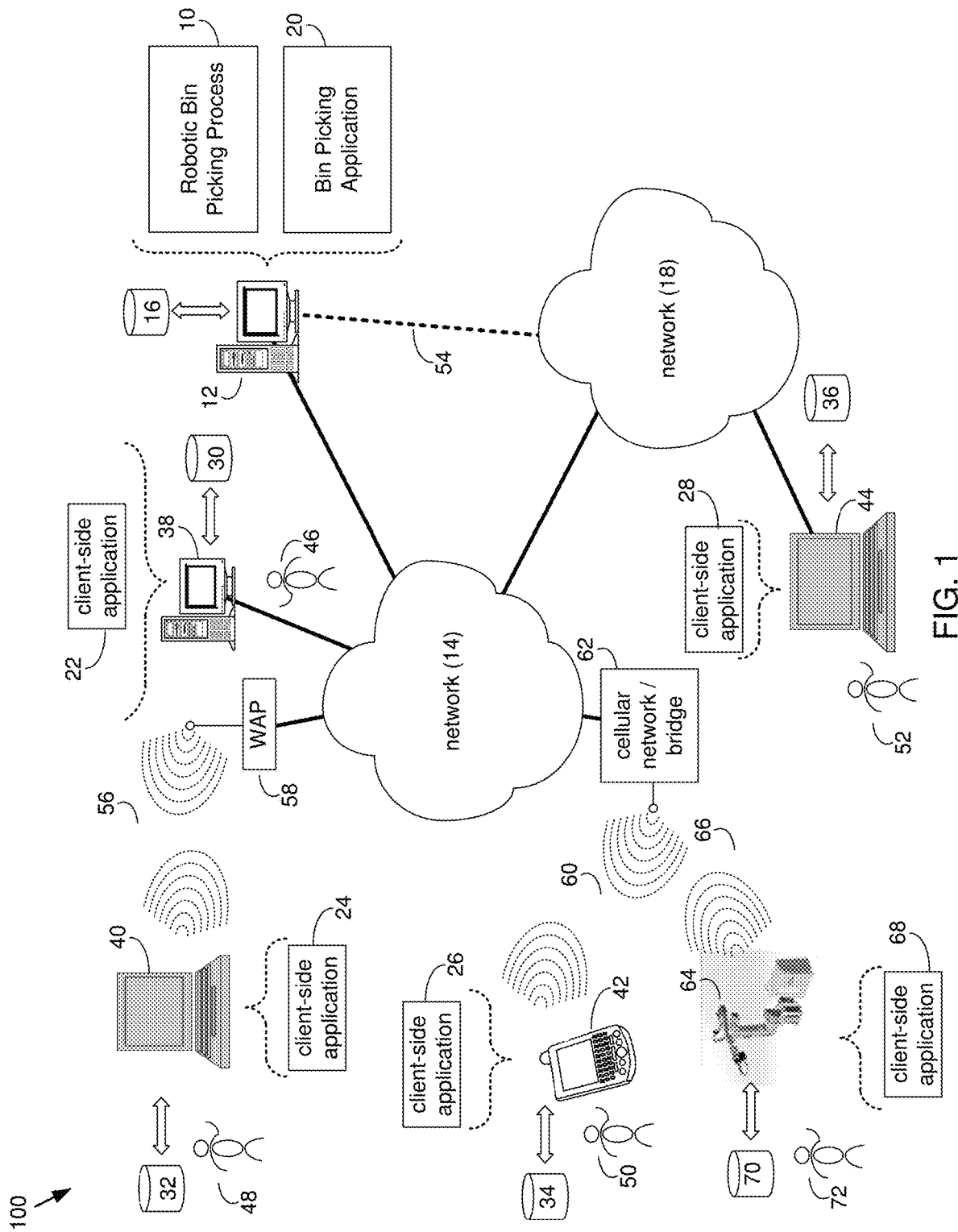
FIG. 1 is a diagrammatic view of a robotic bin picking process coupled to a distributed computing network.

Referring now to FIG. 1, there is shown robotic bin picking process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

Figure 2:
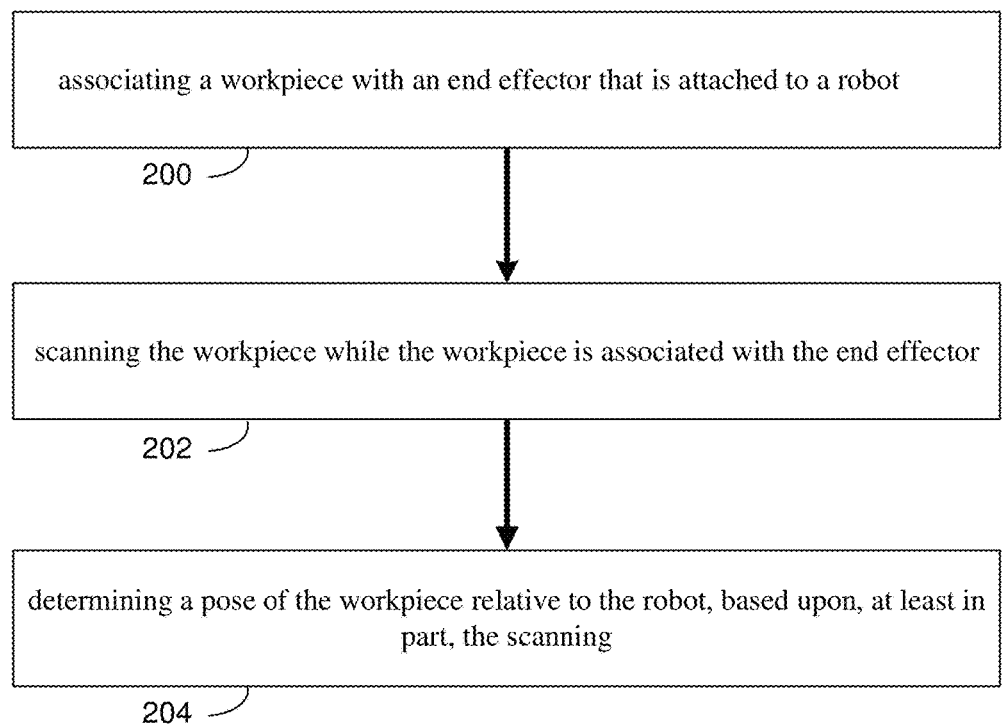
FIG. 2 is a flow chart of one implementation of the robotic bin picking process of FIG. 1.

As will be discussed below in greater detail, robotic bin picking processes, such as robotic bin picking process 10 of FIGS. 1-2, may be used for programming the picking and placing of a workpiece. The process may include associating 200 a workpiece with an end effector that is attached to a robot and scanning 202 the workpiece while the workpiece is associated with the end effector. The process may further include determining 204 a pose of the workpiece relative to the robot, based upon, at least in part, the scanning.

The instruction sets and subroutines of robotic bin picking process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Robotic bin picking process 10 may be a stand-alone application that interfaces with an applet/application that is accessed via client applications 22, 24, 26, 28, 66. In some embodiments, robotic bin picking process 10 may be, in whole or in part, distributed in a cloud computing topology. In this way, computing device 12 and storage device 16 may refer to multiple devices, which may also be distributed throughout network 14 and/or network 18.

Computing device 12 may execute a robotic control application (e.g., robotic control application 20), examples of which may include, but are not limited to, Actin® Software Development Kit from Energid Technologies of Cambridge, Mass. and any other bin picking application or software. Robotic bin picking process 10 and/or robotic control application 20 may be accessed via client applications 22, 24, 26, 28, 68. Robotic bin picking process 10 may be a stand-alone application, or may be an applet/application/script/extension that may interact with and/or be executed within robotic control application 20, a component of robotic control application 20, and/or one or more of client applications 22, 24, 26, 28, 68. Robotic control application 20 may be a stand-alone application, or may be an applet/application/script/extension that may interact with and/or be executed within robotic bin picking process 10, a component of robotic bin picking process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of robotic bin picking process 10 and/or robotic control application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of robotic bin picking process 10 (and vice versa). Accordingly, robotic bin picking process 10 may be a purely server-side application, a purely client-side application, or a hybrid server-side/client-side application that is cooperatively executed by one or more of client applications 22, 24, 26, 28, 68 and/or robotic bin picking process 10.

One or more of client applications 22, 24, 26, 28, 68 may be configured to effectuate some or all of the functionality of robotic control application 20 (and vice versa). Accordingly, robotic control application 20 may be a purely server-side application, a purely client-side application, or a hybrid server-side/client-side application that is cooperatively executed by one or more of client applications 22, 24, 26, 28, 68 and/or robotic control application 20. As one or more of client applications 22, 24, 26, 28, 68 robotic bin picking process 10, and robotic control application 20, taken singly or in any combination, may effectuate some or all of the same functionality, any description of effectuating such functionality via one or more of client applications 22, 24, 26, 28, 68 robotic bin picking process 10, robotic control application 20, or combination thereof, and any described interaction(s) between one or more of client applications 22, 24, 26, 28, 68 robotic bin picking process 10, robotic control application 20, or combination thereof to effectuate such functionality, should be taken as an example only and not to limit the scope of the disclosure.

Users 46, 48, 50, 52 may access computing device 12 and robotic bin picking process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Robotic bin picking process 10 may include one or more user interfaces, such as browsers and textual or graphical user interfaces, through which users 46, 48, 50, 52 may access robotic bin picking process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, robotic system 64 may be wirelessly coupled to network 14 via wireless communication channel 66 established between client electronic device 42 and cellular network/bridge 62, which is shown directly coupled to network 14. Storage device 70 may be coupled to robotic system 64 and may include but is not limited to: hard disk drives; flash drives, tape drives; optical drives; RAID arrays; random access memories (RAM); and read-only memories (ROM). User 72 may access computing device 12 and robotic bin picking process 10 (e.g., using robotic system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, the bin picking system (e.g., bin picking system 64) may include a robot arm (e.g., Universal Robots UR5 available from Universal Robots, etc.), a controller, a gripper, a sensor, and a coprocessor (e.g., to run the computationally expensive operations from perception and task planning). However, it will be appreciated that the bin picking system may include additional components and/or may omit one or more of these example components within the scope of the present disclosure.

Figure 3:
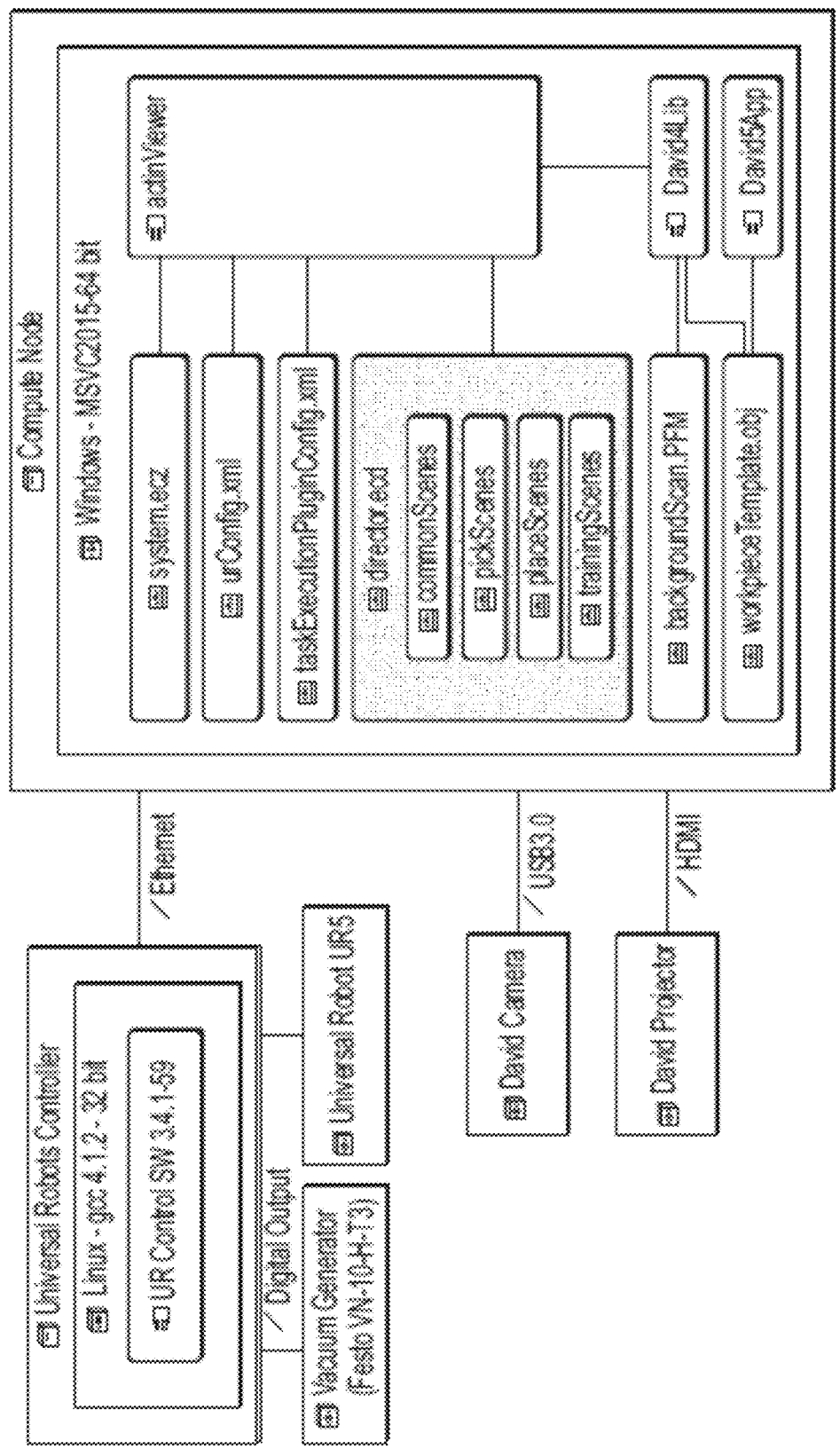
FIG. 3 is the bin picking system configured to run all modules on the coprocessor and interfaces with the UR Controller over an Ethernet connection using the Real-Time Data Exchange interface from UR according to an embodiment of the present disclosure.

In some embodiments, and referring also to FIG. 3, the bin picking system (e.g., bin picking system 64) may be configured to run all modules on the coprocessor and interfaces with the UR Controller over e.g., an Ethernet connection using the Real-Time Data Exchange interface from UR. The software application may be built from custom plugins for one or more graphical user interfaces such as the "Actin Viewer" available from Energid Technologies. In some embodiments, the sensor may any suitable sensor (e.g., a 3D sensor). In some embodiments, the bin picking system (e.g., bin picking system 64) may be configured to run some modules on at least one coprocessor and some modules on the UR controller. In some embodiments, all modules may run on the UR controller.

As used herein, the terms "Actin viewer" may refer to a graphical user interface, "Actin" may refer to robot control software, and "UR" may refer to "Universal Robots". Any use of these particular companies and products is provided merely by way of example. As such, any suitable graphical user interfaces, robot control software, and devices/modules may be used without departing from the scope of the present disclosure.

In some embodiments, the coprocessor may include a core processor and a graphics card. The operating system and compiler may be of any suitable type. The coprocessor may include multiple external interfaces (e.g., Ethernet to the UR Controller, USB3.0 to the camera(s), HDMI to the Projector, etc.). These particular devices and systems, as well as the others described throughout this document, are provided merely by way of example.

In some embodiments, a Universal Robots UR5 may be utilized in bin picking system 64. The controller may be unmodified. For example, a suction cup end of arm tool (EOAT) may be connected to the controller via a e.g., 24 VDC Digital Output channel. However, it will be appreciated that any EOAT may be used on any robotic arm within the scope of the present disclosure.

In some embodiments, any scanner may be used. This may be a structured light sensor and may enable third party integration. Along with the SDK, the scanner may come with the application which may be used to create workpiece mesh templates.

Figure 4:
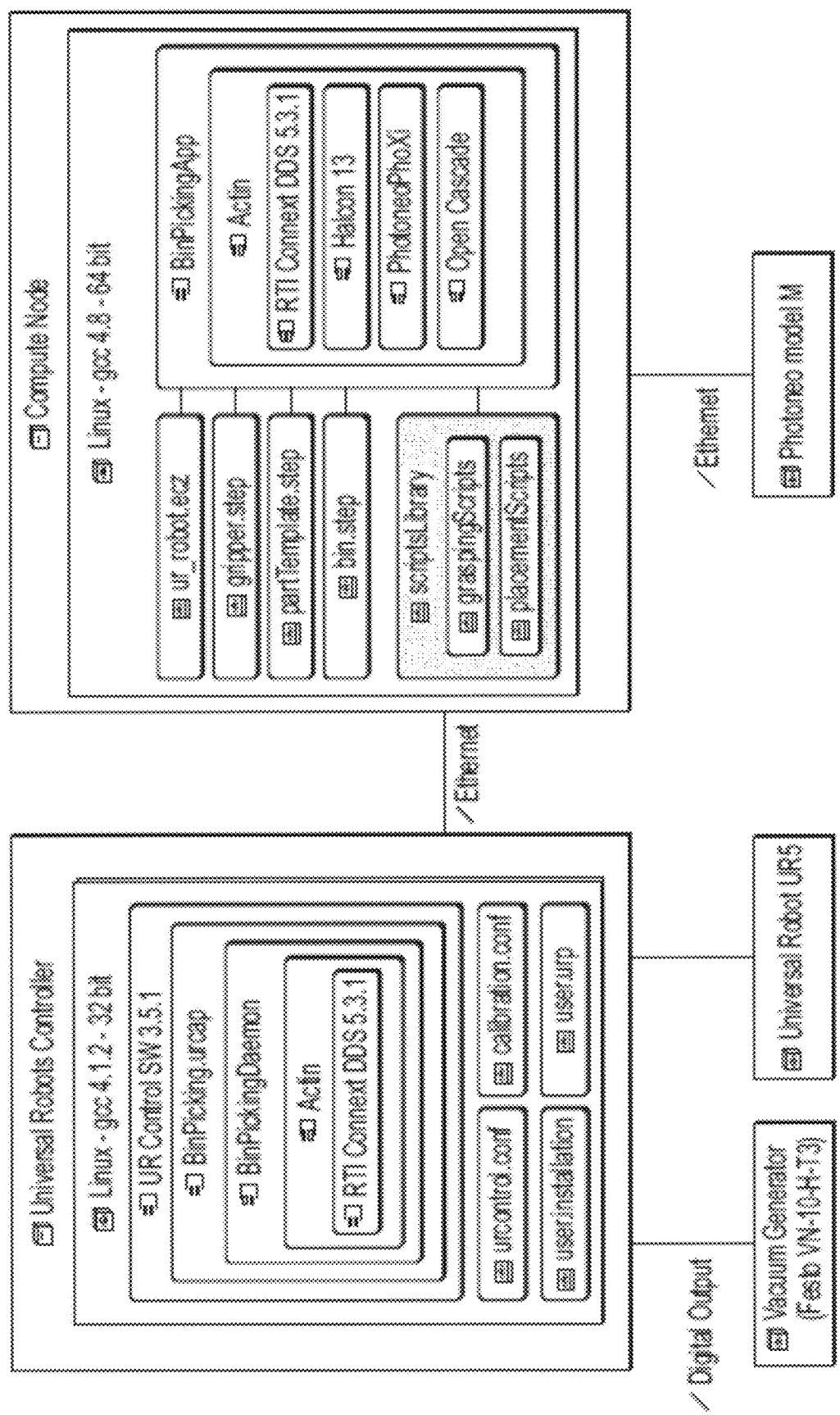
FIG. 4 is an interface showing the bin picking system deployment diagram according to an embodiment of the present disclosure.

In some embodiments, the bin picking application (e.g., bin picking application 20) may be configured to run on the coprocessor of the bin picking system (e.g., bin picking system 64) in lieu of the GUI based Actin Viewer discussed above. For example, the user interface may be moved to the controller and teach pendent via a bin picking cap. A "cap", as used herein, may generally refer to a robotic capability, accessory, or peripheral. A "UR" cap may refer to a cap available from "Universal Robotics" or the Assignee of the present disclosure. In one example, a $C^{++}$ Cap Daemon may run on the controller to enable communication with the coprocessor over RTI Connext DDS. An example deployment is shown in FIG. 4.

In some embodiments, the bin picking system may include multiple phases. These phases may include, but are not limited to: installation; calibration and alignment; application configuration; and bin picking operation.

In some embodiments, a bin picking system may be configured. For example, the robot, sensor, and gripper may be all installed physically and calibrated in this phase of operation. The sensor calibration may be performed to identify the intrinsic and extrinsic parameters of the camera and projector. The sensor to robot alignment may be performed using a 3D printed alignment object consisting of an array of spheres. For example, a target workpiece may be easily detected and it may define the robot coordinate frame that workpiece pose estimates are relative to. Installation, calibration, and alignment parameters may be saved to files on the coprocessor.

In some embodiments, the bin picking program configuration phase is where the user configures the bin picking system to perform a bin picking operation with a given workpiece and placement or fixture. The user may first load or create a new program configuration. Creating a new program may include, but is not limited to, configuring the tool, workpiece template, and bin followed by training grasps and placements.

In the bin picking operation phase, the user may trigger the bin picking system to perform bin picking or stop, and monitors the progress. The bin picking system may run automatically and scan the bin prior to each pick attempt. In some embodiments, there are two anticipated user roles for the bin picking system these may include the user role and developer role. The user may interact with the bin picking system through a graphical user interface (e.g., no programming experience may be required). The developer may extend the bin picking software to include new sensor support, new grippers, new pose estimation (Matcher) algorithms, new boundary generators, and new grasp script selectors. Various tasks may be performed by users and other tasks may be performed by developers.

Figure 5:
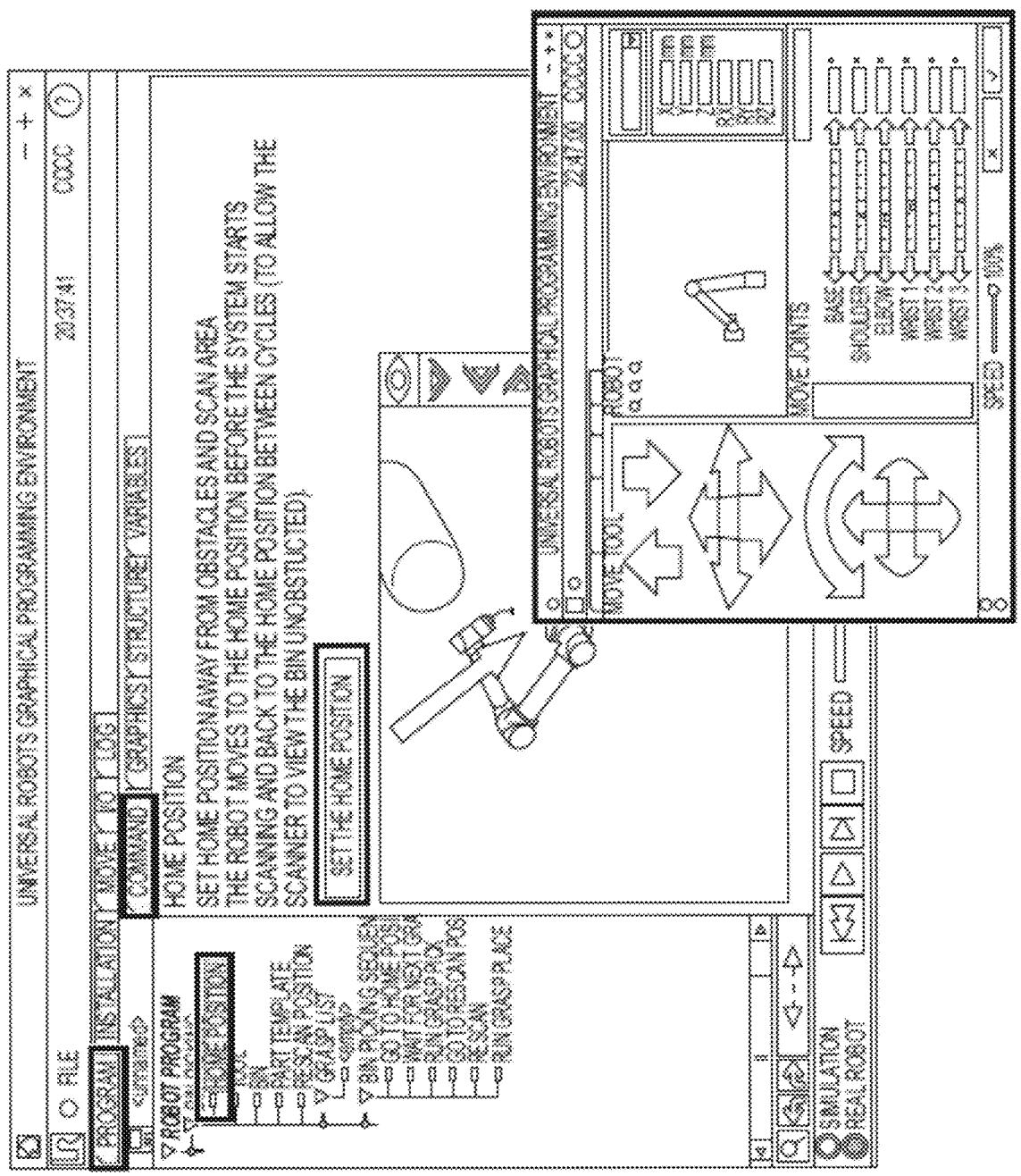
FIG. 5 is a graphical user interface that allows a user to set a home position according to an embodiment of the present disclosure.

Referring now to FIG. 5, a graphical user interface that allows a user to set a home position is provided. The user may select the "home position" option in the program tree and then select "set the home position". The user may then follow the instructions on the teach pendant to move the robot to the desired home position.

Figure 6:
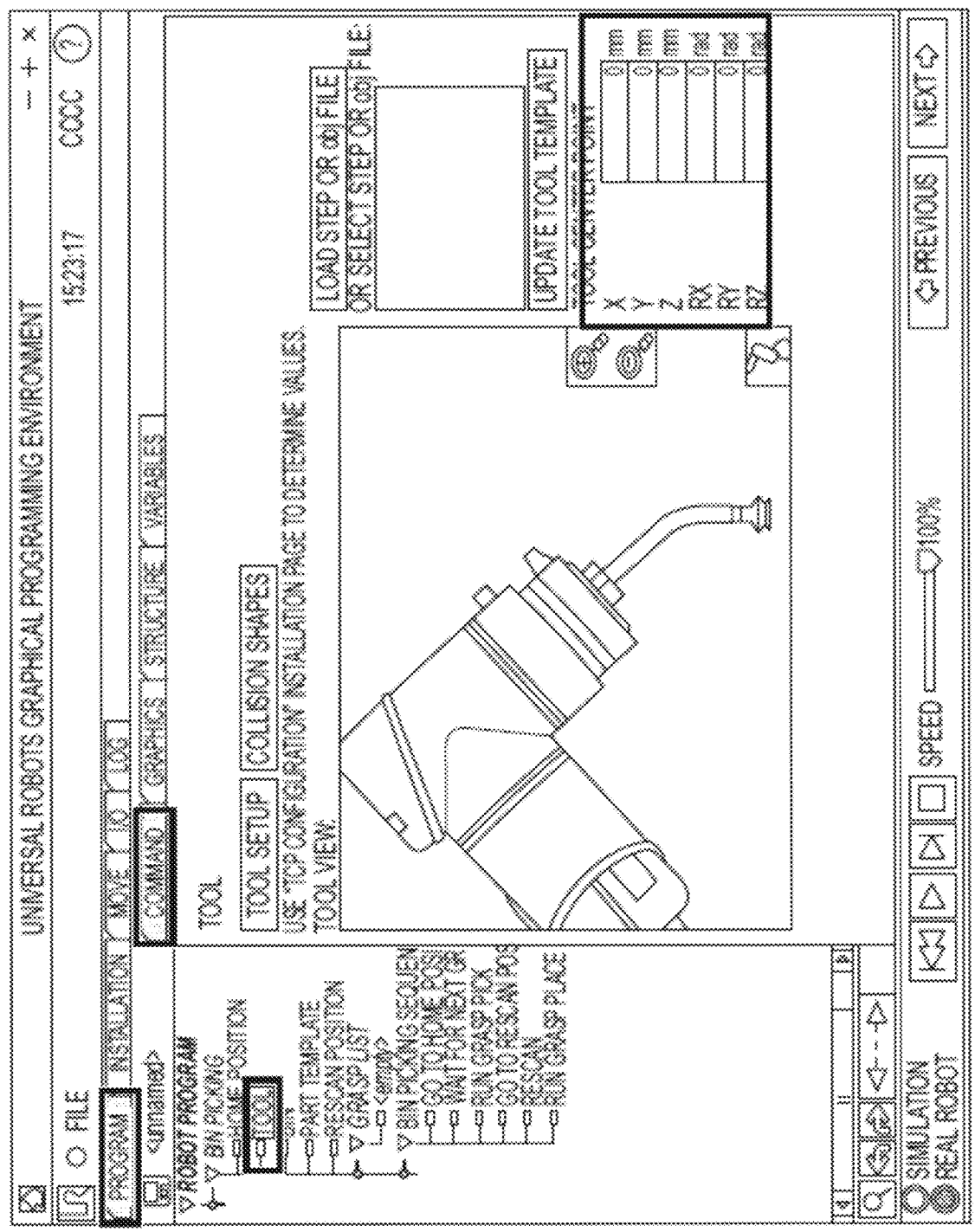
FIG. 6 is a graphical user interface that allows a user to configure the tool according to an embodiment of the present disclosure.

Referring now to FIG. 6, a graphical user interface that allows a user to configure the tool is provided. The user may select the "tool" option in the program tree and set the tool center point by manually typing in the coordinates and orientations. The user may be provided with an option to load an object file as well.

Figure 7:
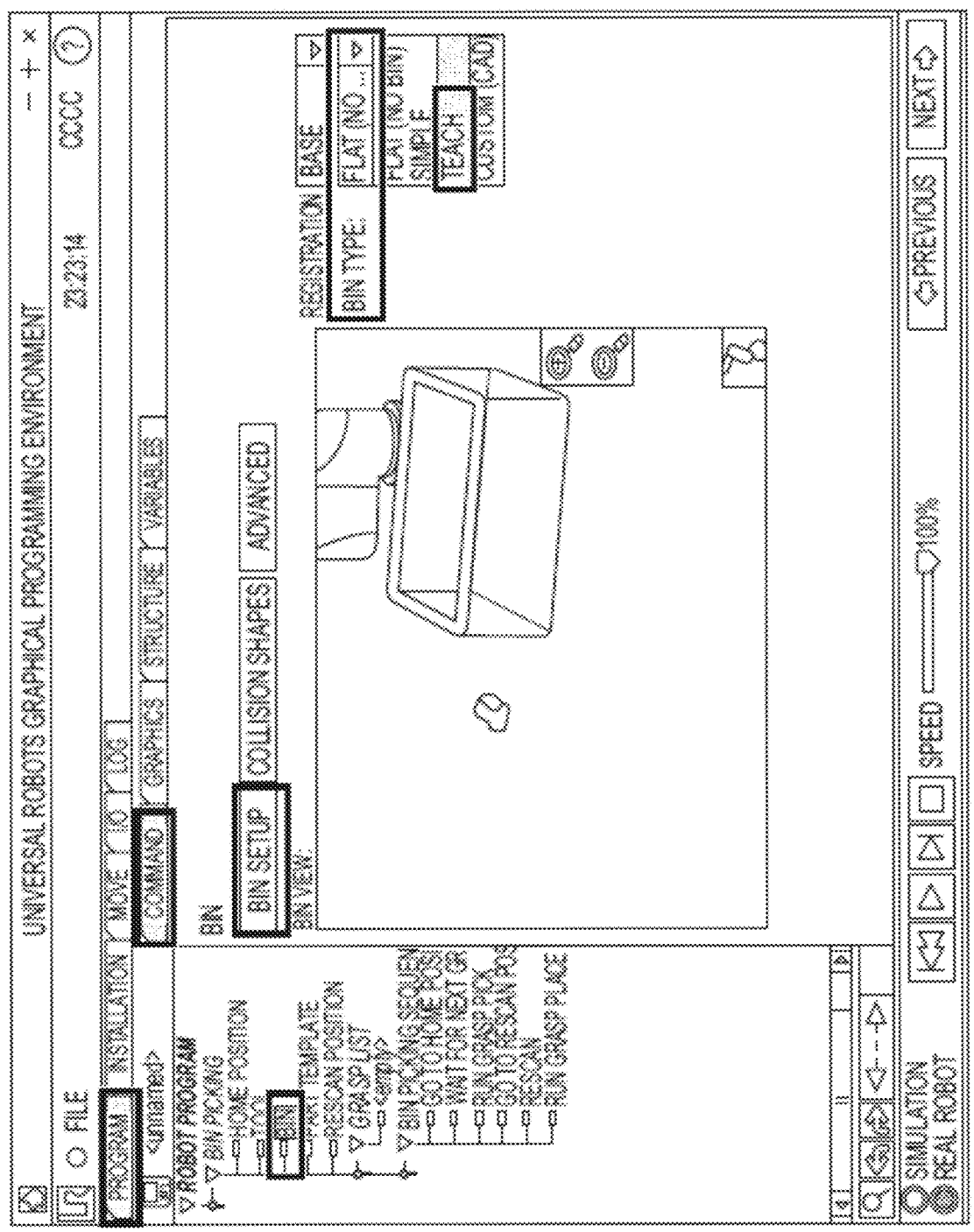
FIG. 7 is a graphical user interface that allows a user to register a bin according to an embodiment of the present disclosure.

Referring now to FIG. 7, a graphical user interface that allows a user to register a bin is provided. The user may select the "base" option as the registration plane and select the "teach" option as the bin type. A pointer may be mounted to the end effector.

Figure 8:
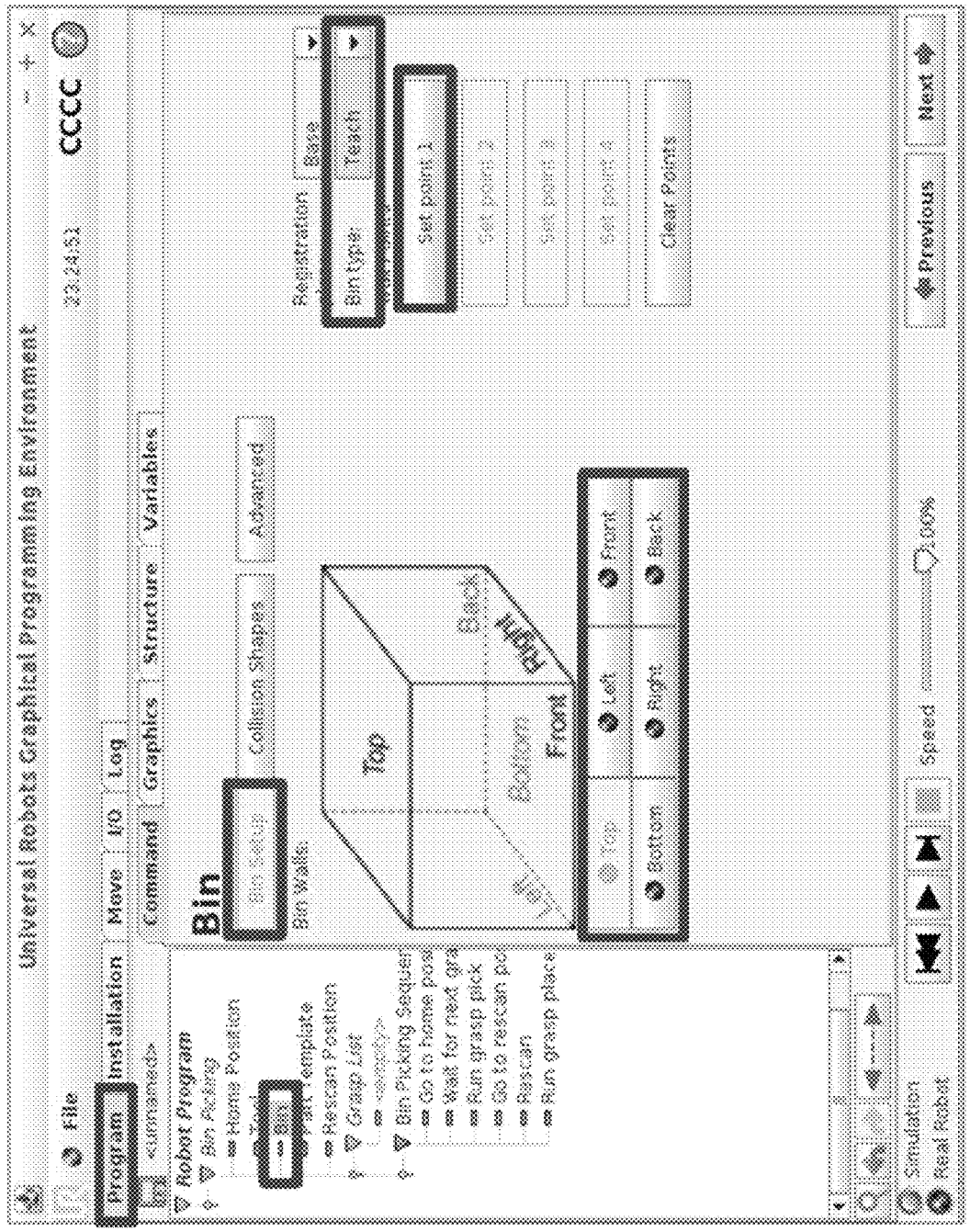
FIG. 8 is a graphical user interface that allows a user to register a bin according to an embodiment of the present disclosure.

Referring now to FIG. 8, a graphical user interface that allows a user to register a bin is provided. The user may use the pointer to touch four points on the interior of each bin wall to register. In some embodiments, the teaching points may be spread out. A side definition illustration may be provided to register each side. An LED indicator may toggle once registration is complete.

Figure 9:
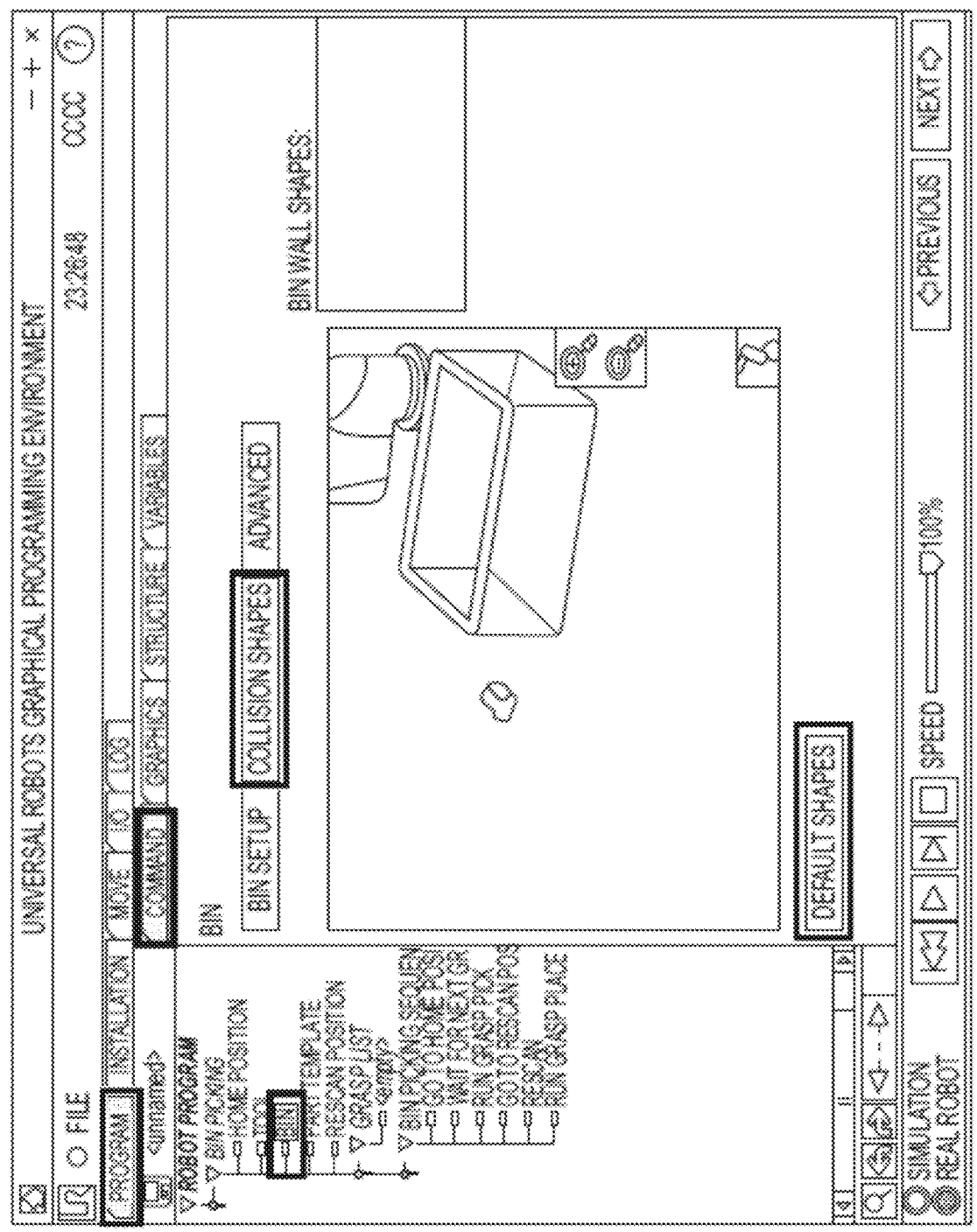
FIG. 9 is a graphical user interface that allows a user to configure bin collision shapes according to an embodiment of the present disclosure.

Referring now to FIG. 9, a graphical user interface that allows a user to configure bin collision shapes is provided. The user may select the "default shapes" option to define collision shapes for the bin based on the registration. In some embodiments, the user may change the size of the collision shapes.

Figure 10:
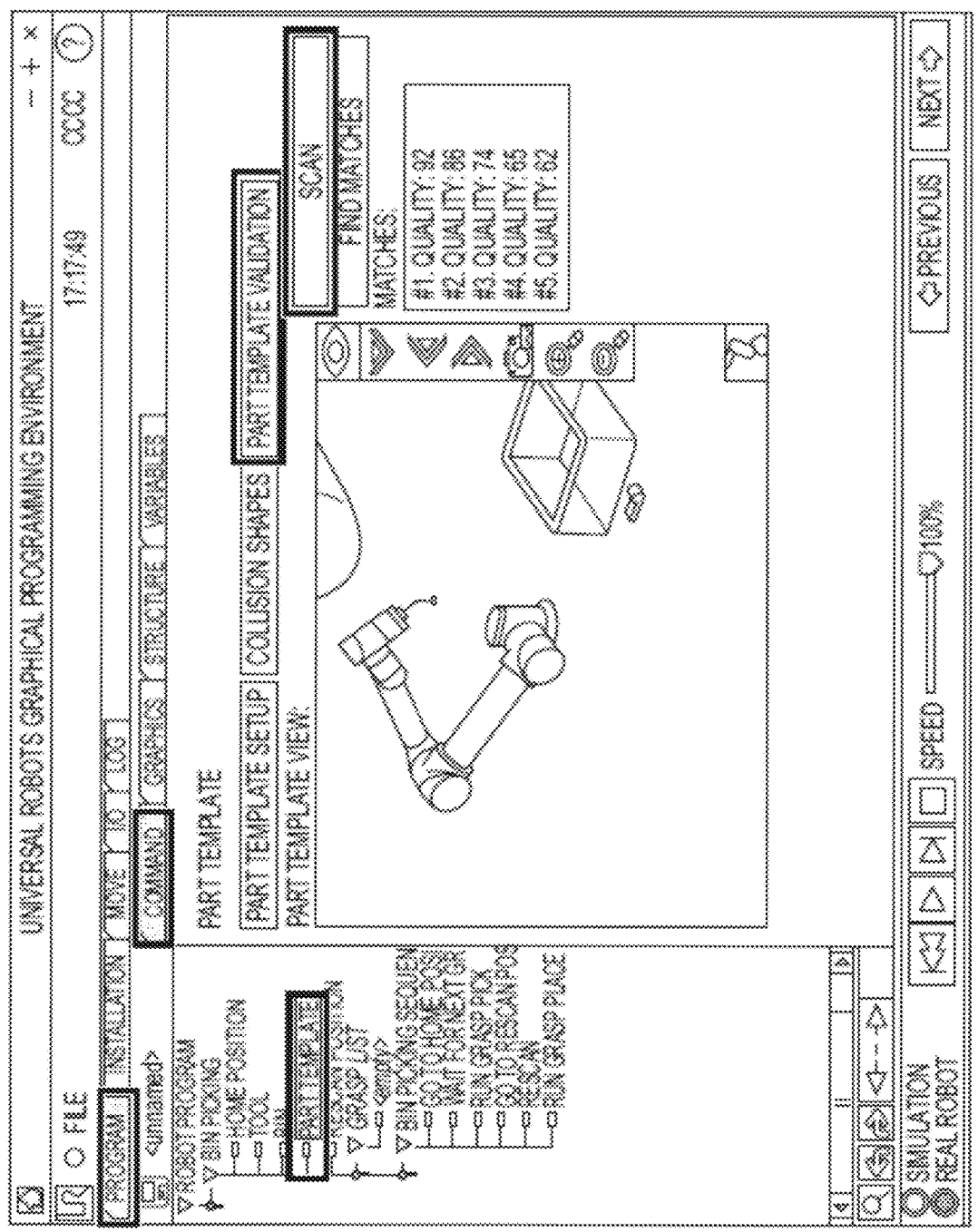
FIG. 10 is a graphical user interface that allows a user to validate a part template according to an embodiment of the present disclosure.

Referring now to FIG. 10, a graphical user interface that allows a user to validate a part template is provided. The user may select the "scan" option to scan a workpiece in the bin. In some embodiments, the bin picking system may attempt to match the point cloud with the part template.

Figure 11:
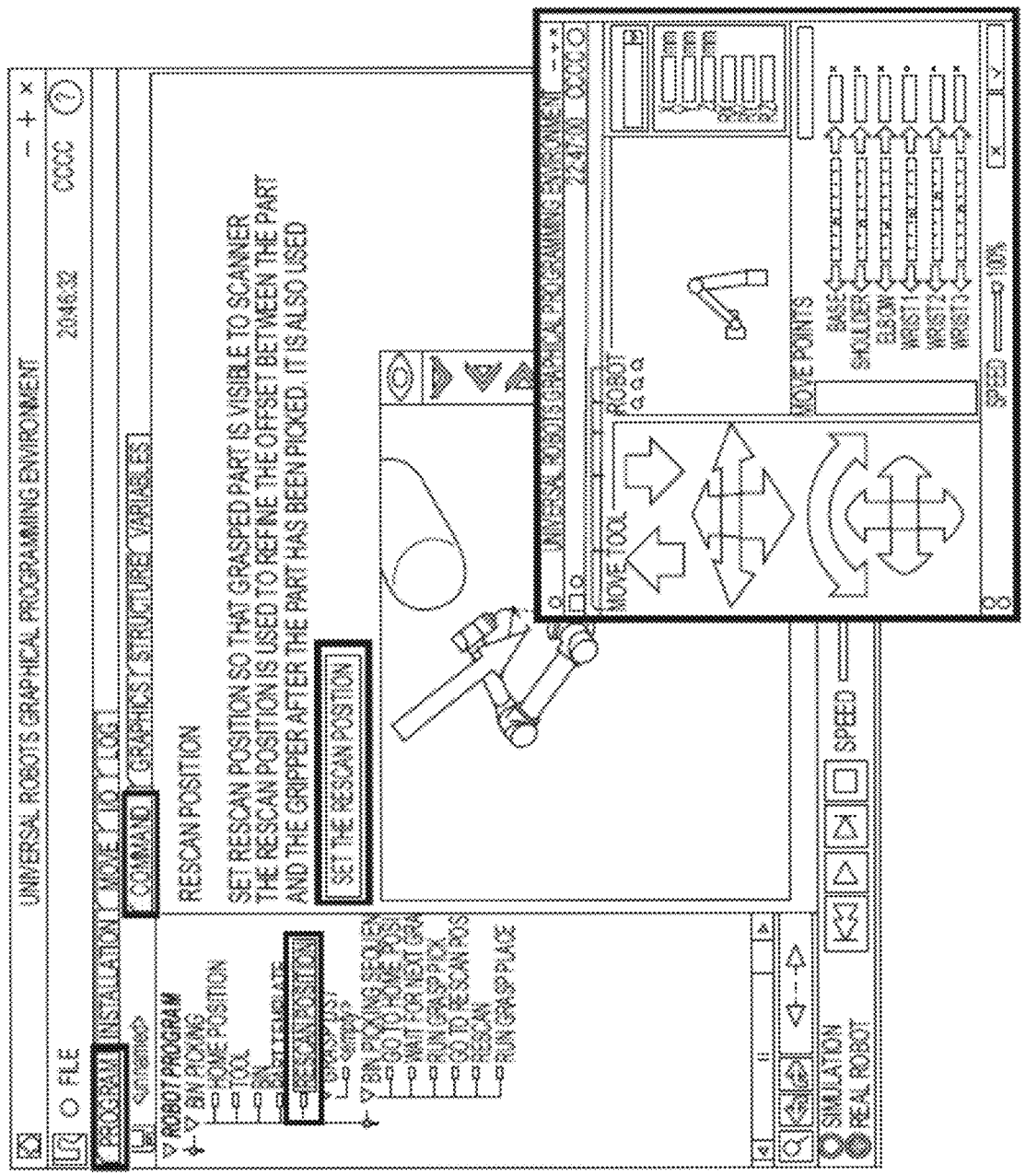
FIG. 11 is a graphical user interface that allows a user to configure a rescan position according to an embodiment of the present disclosure.

Referring now to FIG. 11, a graphical user interface that allows a user to configure a rescan position is provided. The user may select the "rescan position" option in the program tree and elect to "set the rescan position". Once the robot has been moved to the desired rescan position the user may select "ok".

Figure 12:
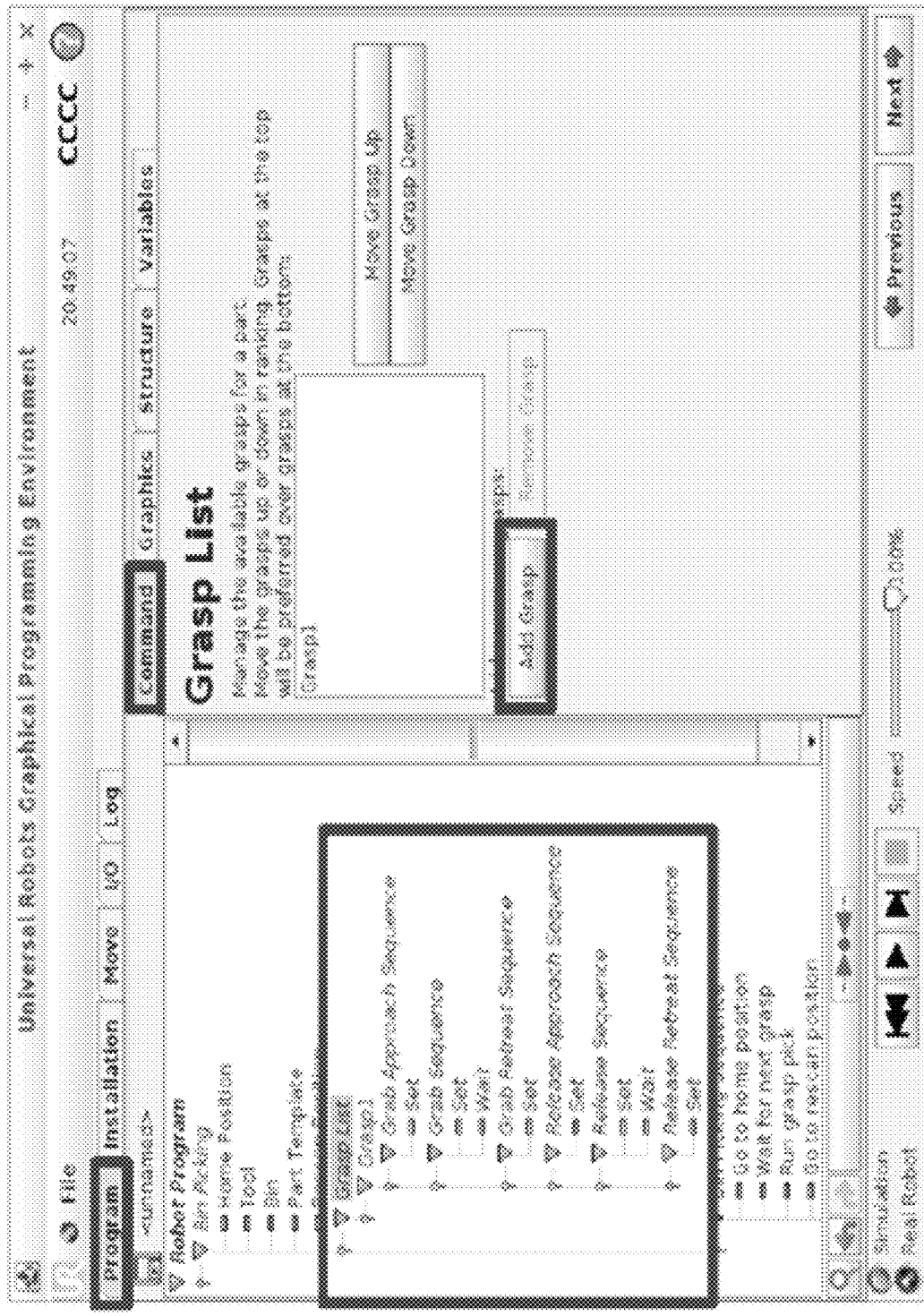
FIG. 12 is a graphical user interface that allows a user to add a grasp according to an embodiment of the present disclosure.

Referring now to FIG. 12, a graphical user interface that allows a user to edit a grasp list is provided. In some embodiments, the grasp list may define the order of priority to use when evaluating grasps. Grasps may be added and removed by selecting "add grasp" or "remove grasp". The selected grasp may be moved up or down in the list with the buttons as shown in the figure.

Figure 13:
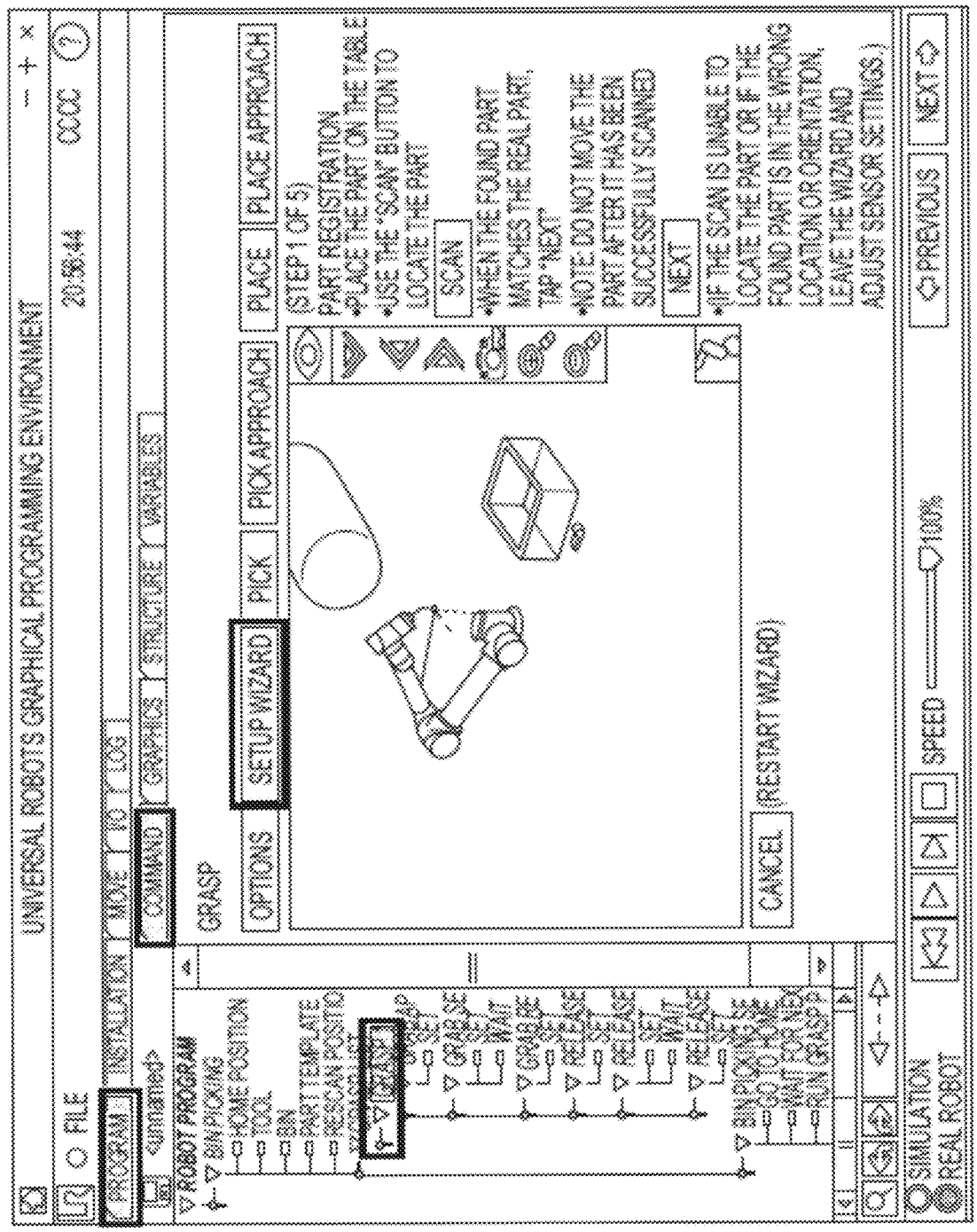
FIG. 13 is a graphical user interface that allows a user to train grasp and placement according to an embodiment of the present disclosure.

Referring now to FIG. 13, a graphical user interface that allows a user to view a grasp wizard is provided. The user may select the new grasp node in the program tree or select "next" to access the grasp wizard. The user may change the grasp name under the "options" tab.

Figure 14:
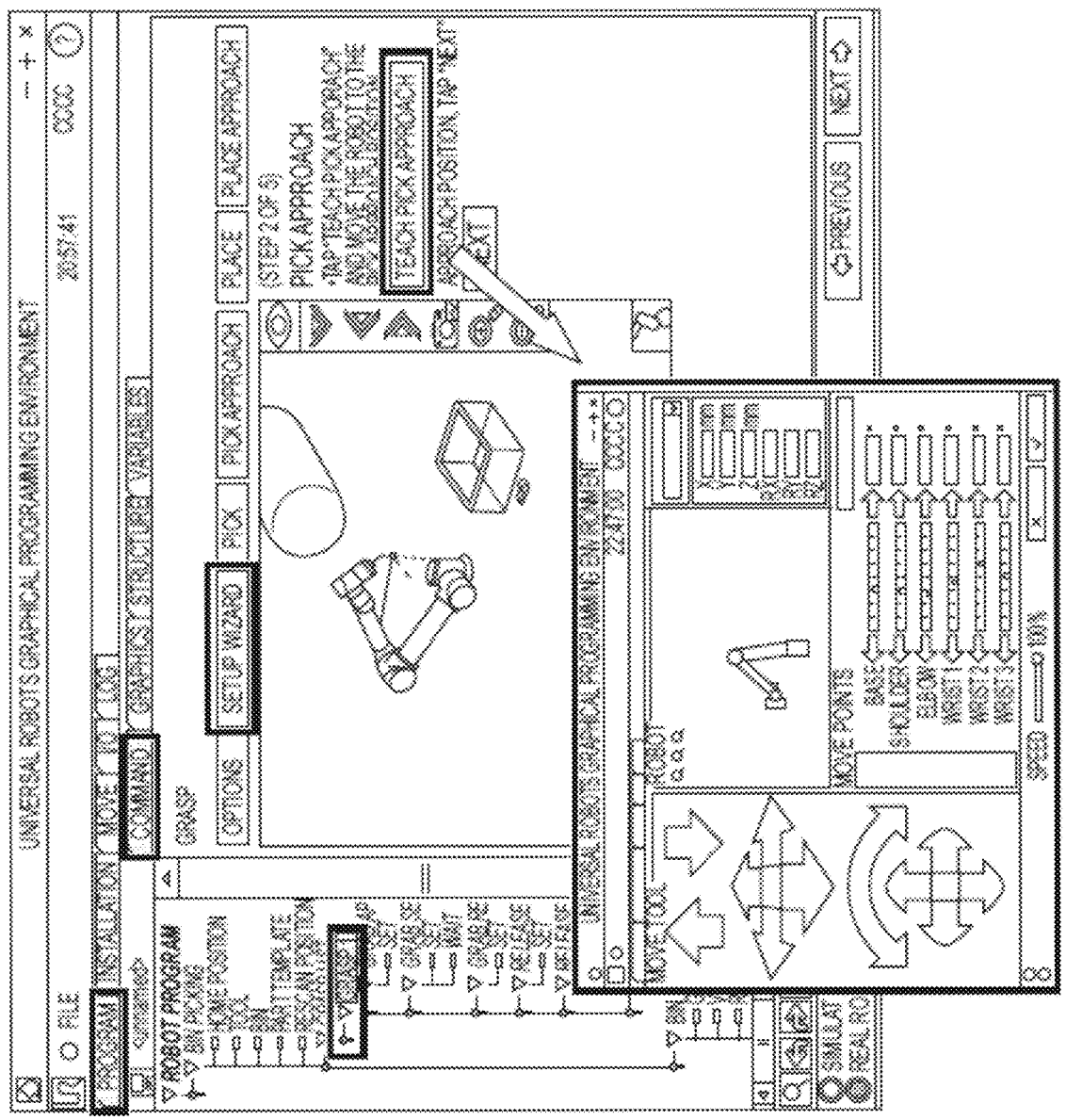
FIG. 14 is a graphical user interface that allows a user to train the pick according to an embodiment of the present disclosure.

Referring now to FIG. 14, a graphical user interface that allows a user to train the pick is provided. The user may select the "teach pick approach" option and move the robot to the pick approach position. The approach position should not be in the part template collision zone. The user may select the "ok" option to record the position and then continue to set other positions.

Figure 15:
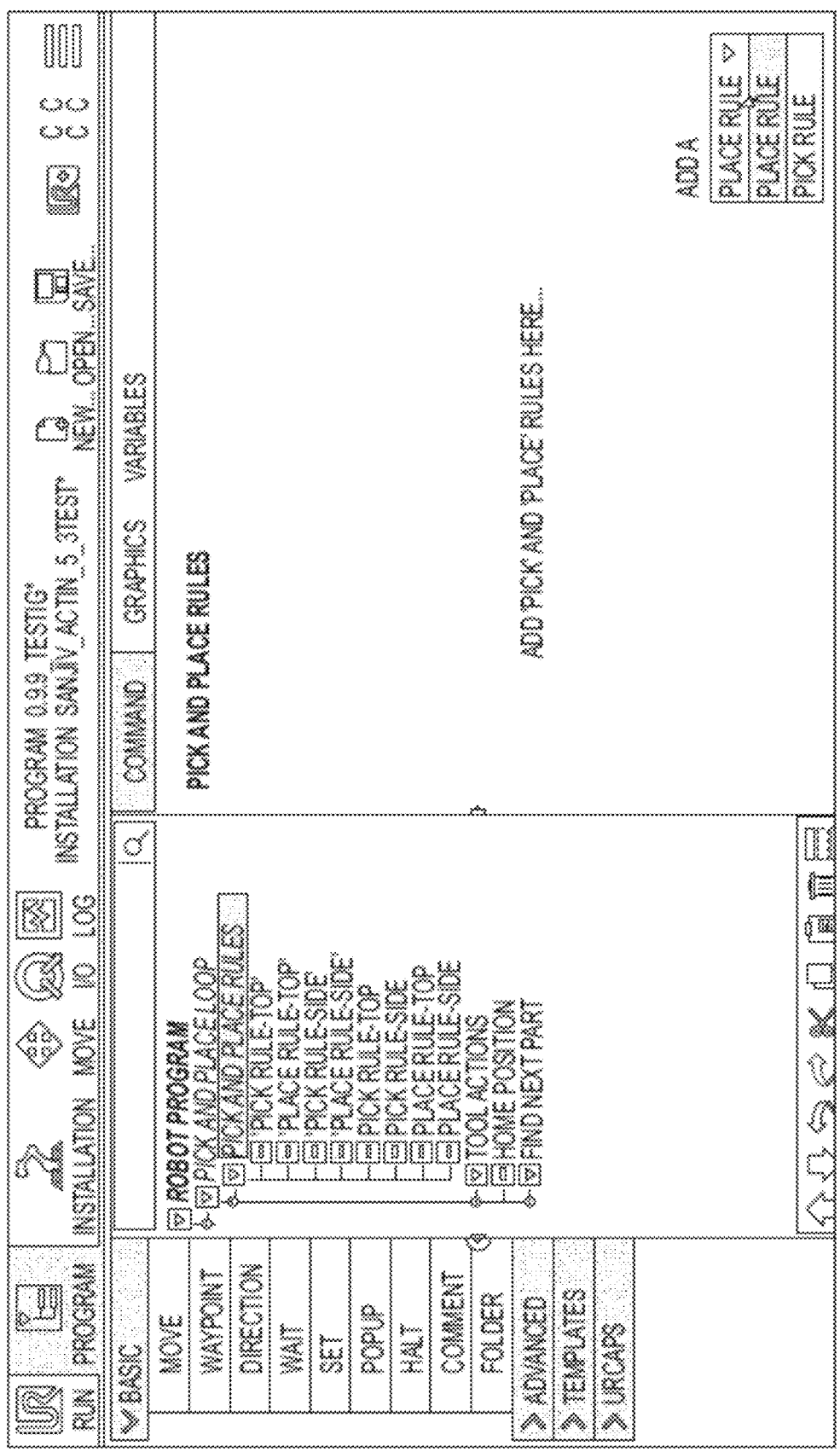
FIG. 15 is a graphical user interface that allows a user to set a pick rule according to an embodiment of the present disclosure.

Referring now to FIGS. 15-26, embodiments of robotic bin picking process 10 show various graphical user interfaces that may be used to program the robot by scanning a workpiece that may be associated with and/or attached to its end effector and determining a pose of the workpiece relative to the robot, based upon, at least in part, the scanning. FIG. 15 shows an example graphical user interface that may be used to begin the process of adding a pick rule or a place rule.

Figure 16:
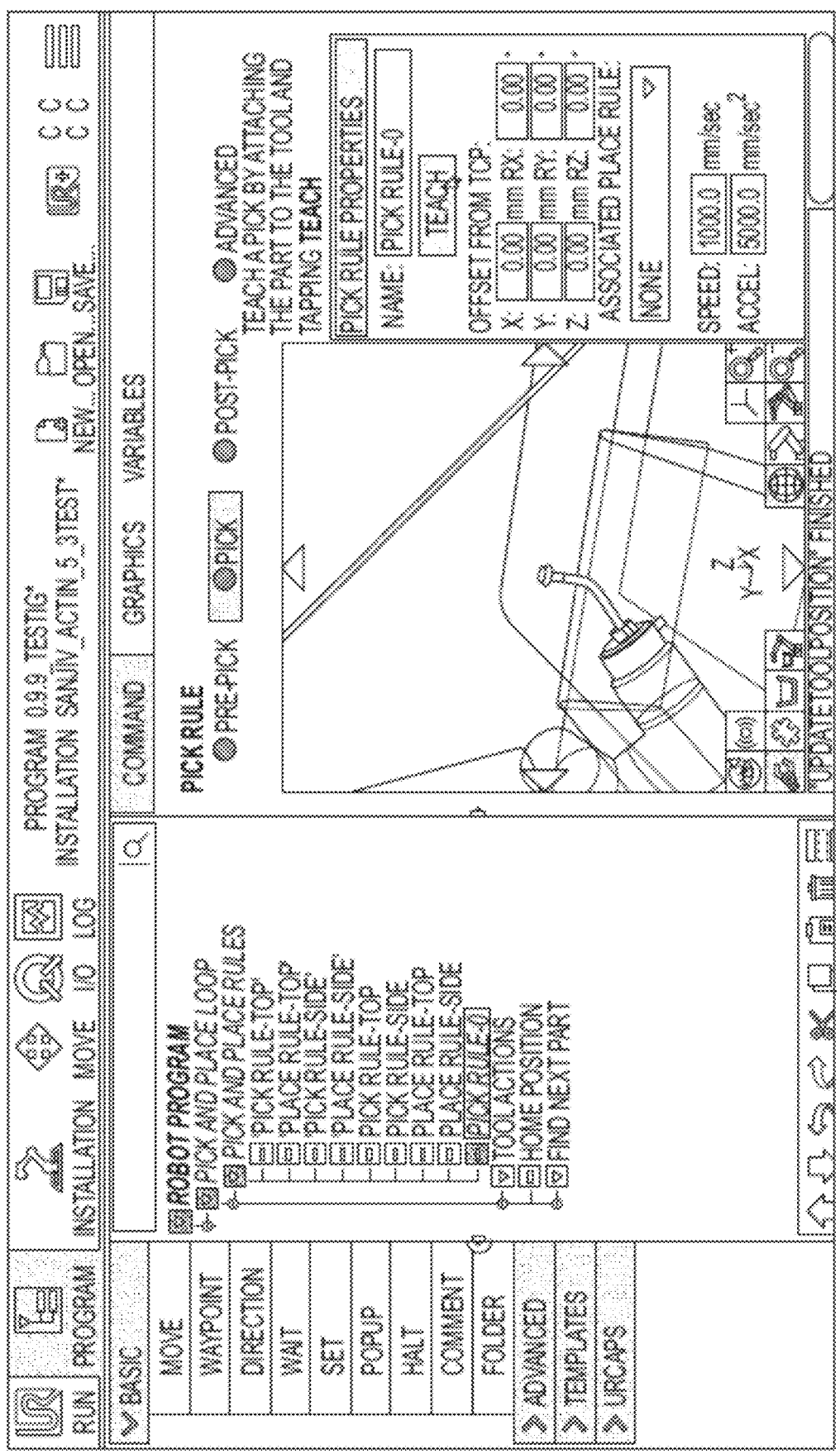
FIG. 16 is a graphical user interface that allows a user to set a pick rule according to an embodiment of the present disclosure.

In some embodiments, and as shown in FIG. 16, robotic bin picking process 10 may include associating a workpiece with an end effector that is attached to a robot. In operation, a user may select a workpiece and teach a pick by attaching the workpiece to the end effector or tool associated with the robot. It should be noted that the workpiece may be associated with the end effector using any suitable approach, including, but not limited to, magnetized attachment, suction attachment, etc. Once the workpiece is associated with the end effector the user may select the "teach" option. A offset from the tool center point ("TCP") may also be displayed and/or edited by the user at the graphical user interface.

Figure 17:
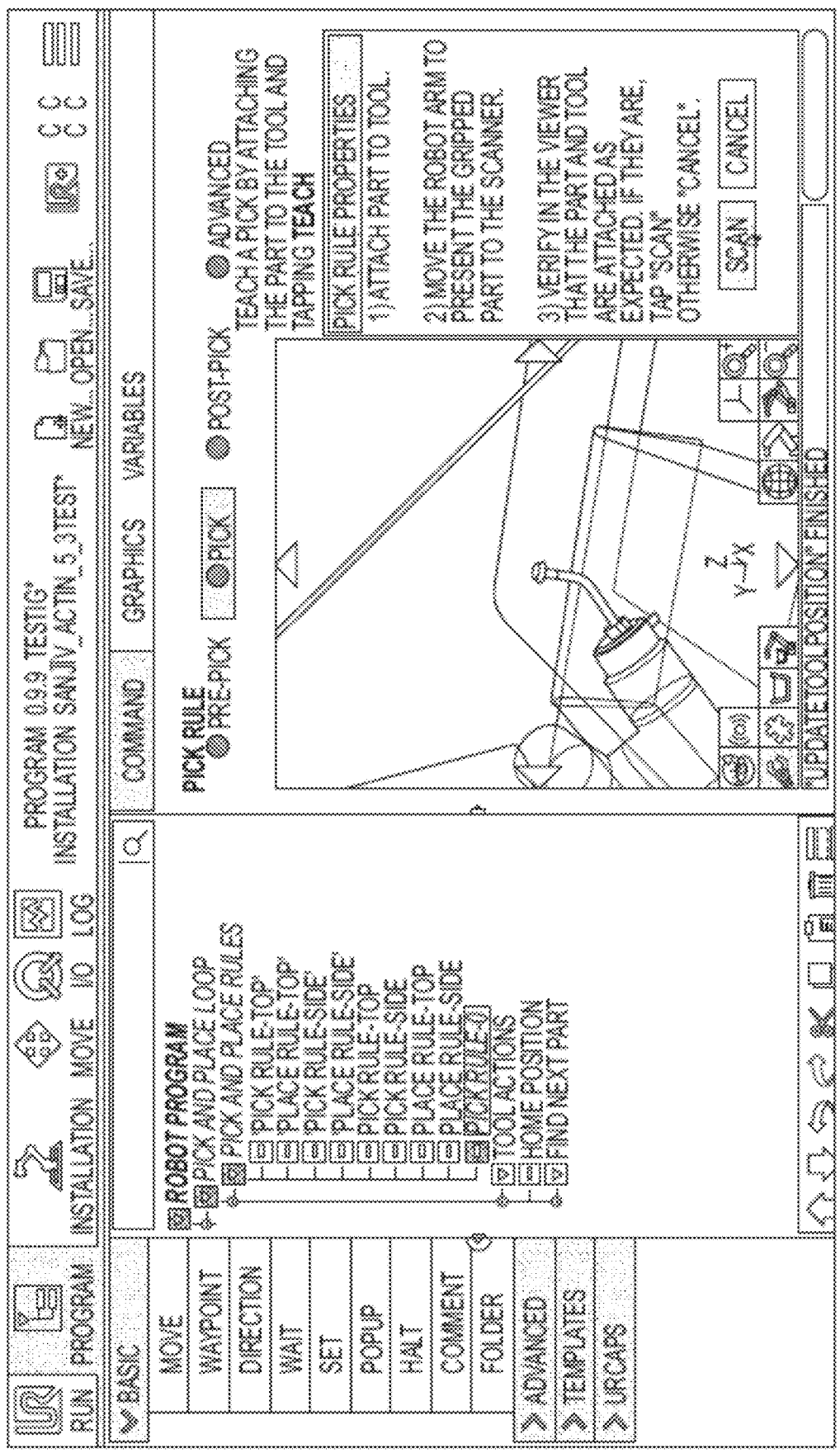
FIG. 17 is a graphical user interface that allows a user to set a pick rule according to an embodiment of the present disclosure.
Figure 18:
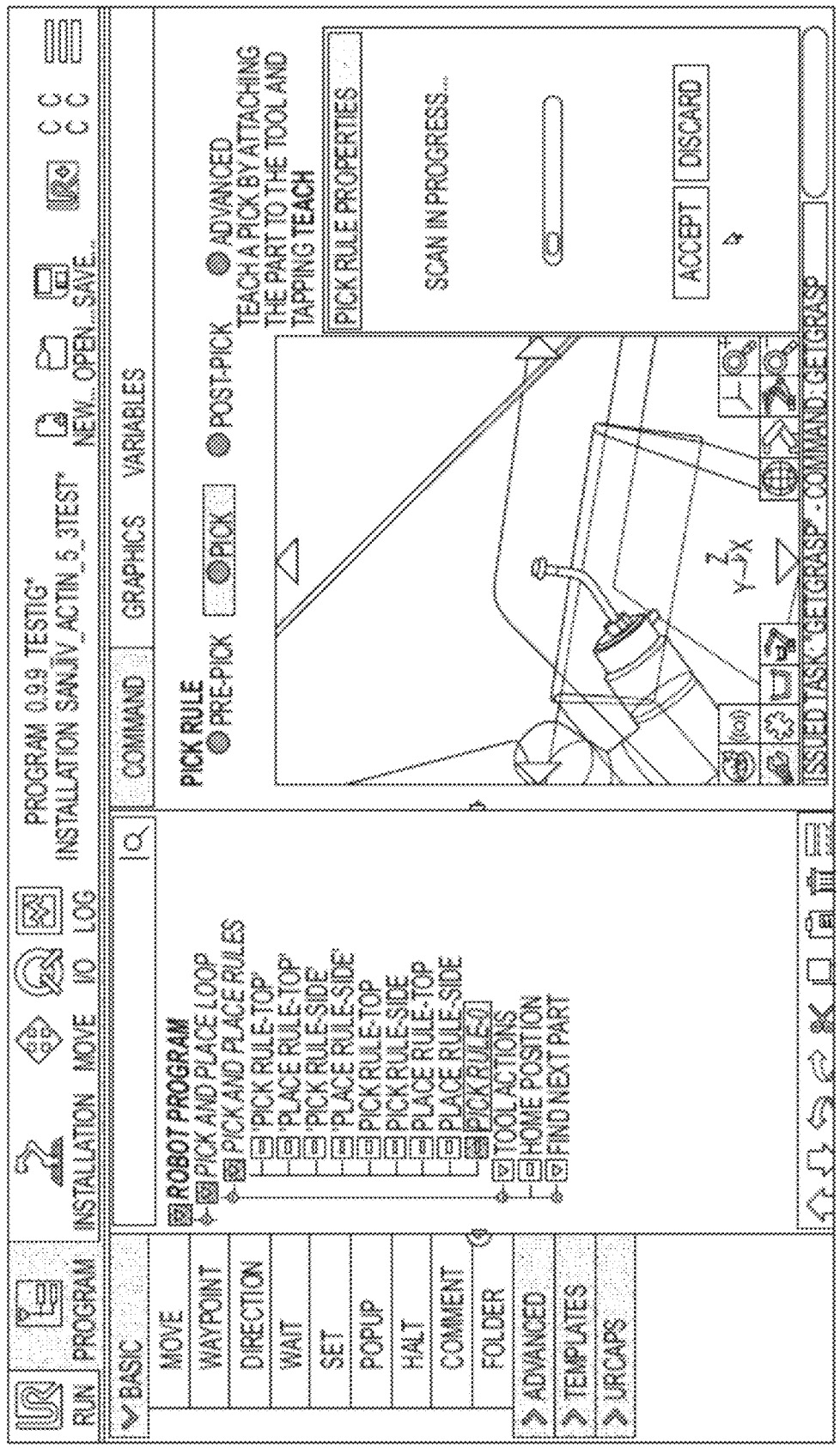
FIG. 18 is a graphical user interface that allows a user to set a pick rule according to an embodiment of the present disclosure.

In some embodiments, and as shown in FIG. 17, robotic bin picking process 10 may include scanning the workpiece while the workpiece is associated with the end effector. As such, the robot arm and/or end effector may be moved so that the scanner may scan the workpiece that has been associated with the end effector. The user may then verify at the graphical user interface that the workpiece and end effector are associated or attached as expected. If the user has verified the alignment he or she may select the scan option. If the alignment needs further adjusting it may be cancelled and one or more adjustments may be made. If the scan option is selected the graphical user interface may indicate that a scan is in progress as shown in FIG. 18.

Figure 19:
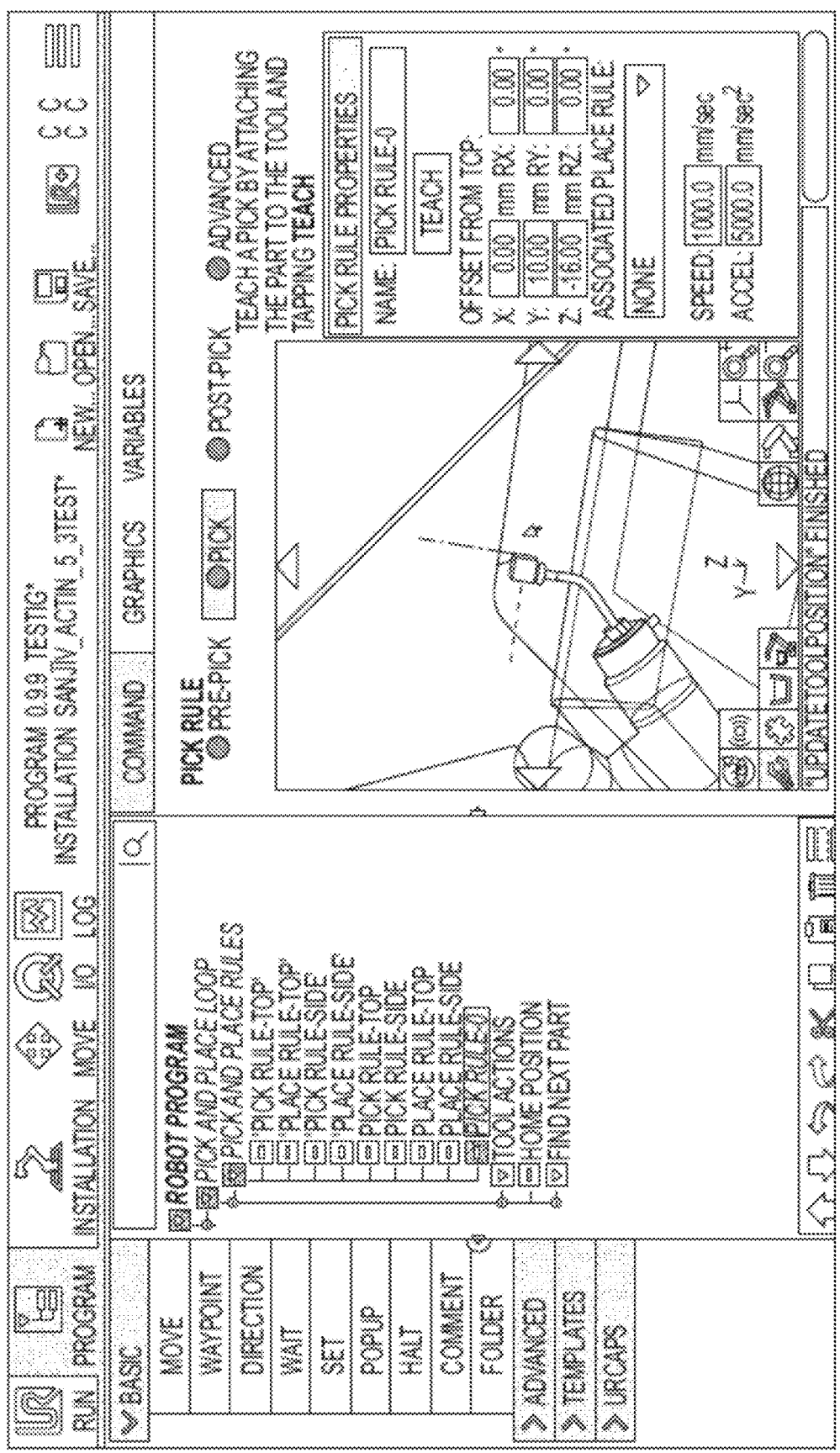
FIG. 19 is a graphical user interface that allows a user to set a pick rule according to an embodiment of the present disclosure.
Figure 20:
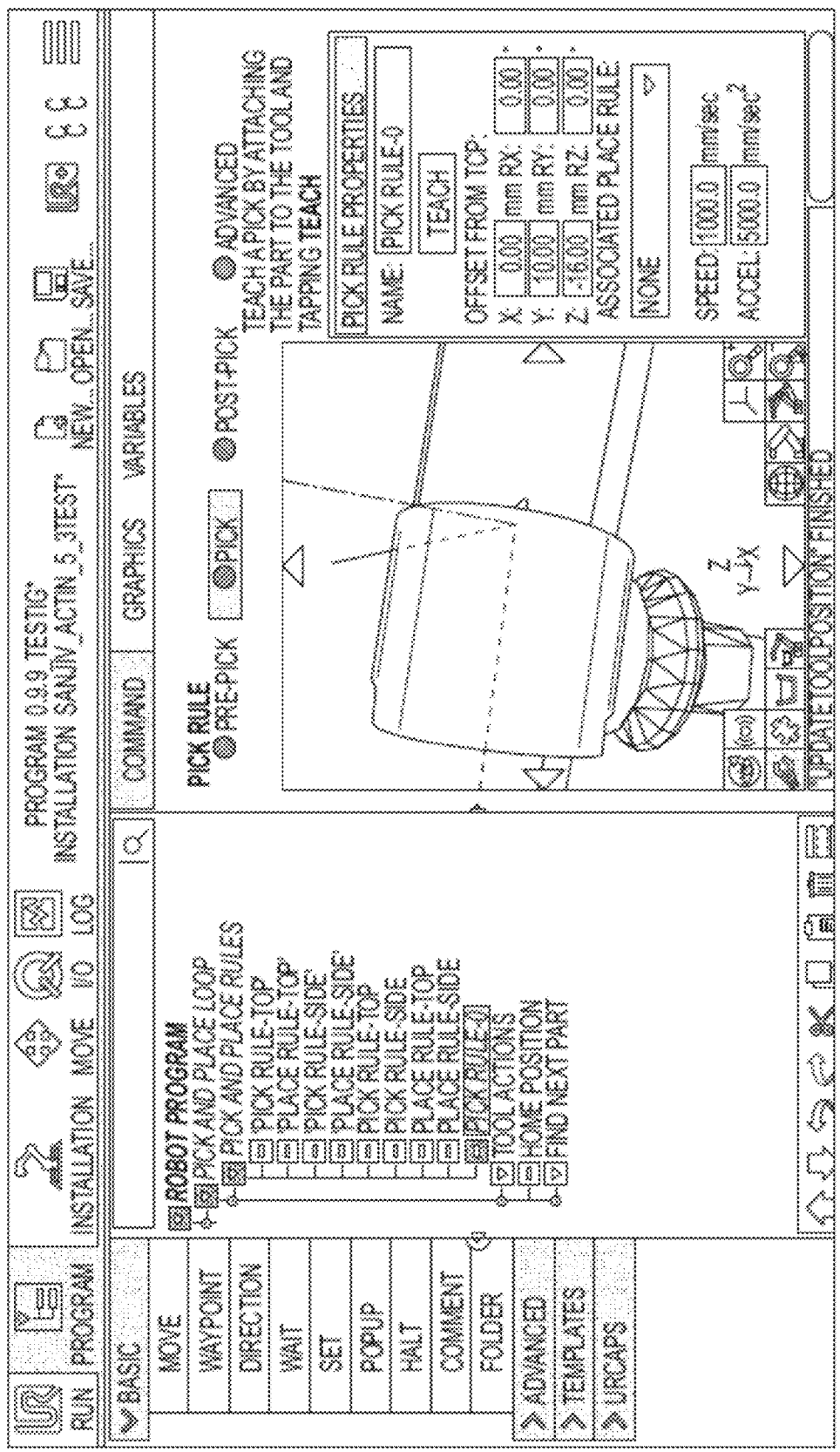
FIG. 20 is a graphical user interface that allows a user to set a pick rule according to an embodiment of the present disclosure.

In some embodiments, robotic bin picking process 10 may include determining a pose of the workpiece relative to the robot, based upon, at least in part, the scanning. As is shown in FIG. 19, the pose of the workpiece relative to the robot or end effector may be displayed to the user at the graphical user interface. This may allow for both a visual verification of the workpiece and the manner in which it is associated with the end effector as well as the X, Y, and Z offsets from the TCP as shown in FIGS. 19-20. The X, Y, and Z coordinate system may be shown at the graphical user interface and may be adjusted based upon user preferences. The process may allow a user to adjust the pose of the workpiece relative to the robot by entering and/or editing the coordinates. The adjusted pose of the workpiece may be displayed at the graphical user interface for verification.

In some embodiments, robotic bin picking process 10 may include picking up the workpiece using the robot and/or end effector. This may include specifying one or more poses of the robot relative to the pose of the workpiece.

In some embodiments, robotic bin picking process 10 may include placing the workpiece, wherein placing the workpiece includes determining a robot pose and inferring the pose of the workpiece from the robot pose. Placing the workpiece may also include specifying one or more poses of the robot relative to the pose of the workpiece. In some embodiments, scanning the workpiece and determining may occur while the robot is in a fixed position.

Figure 21:
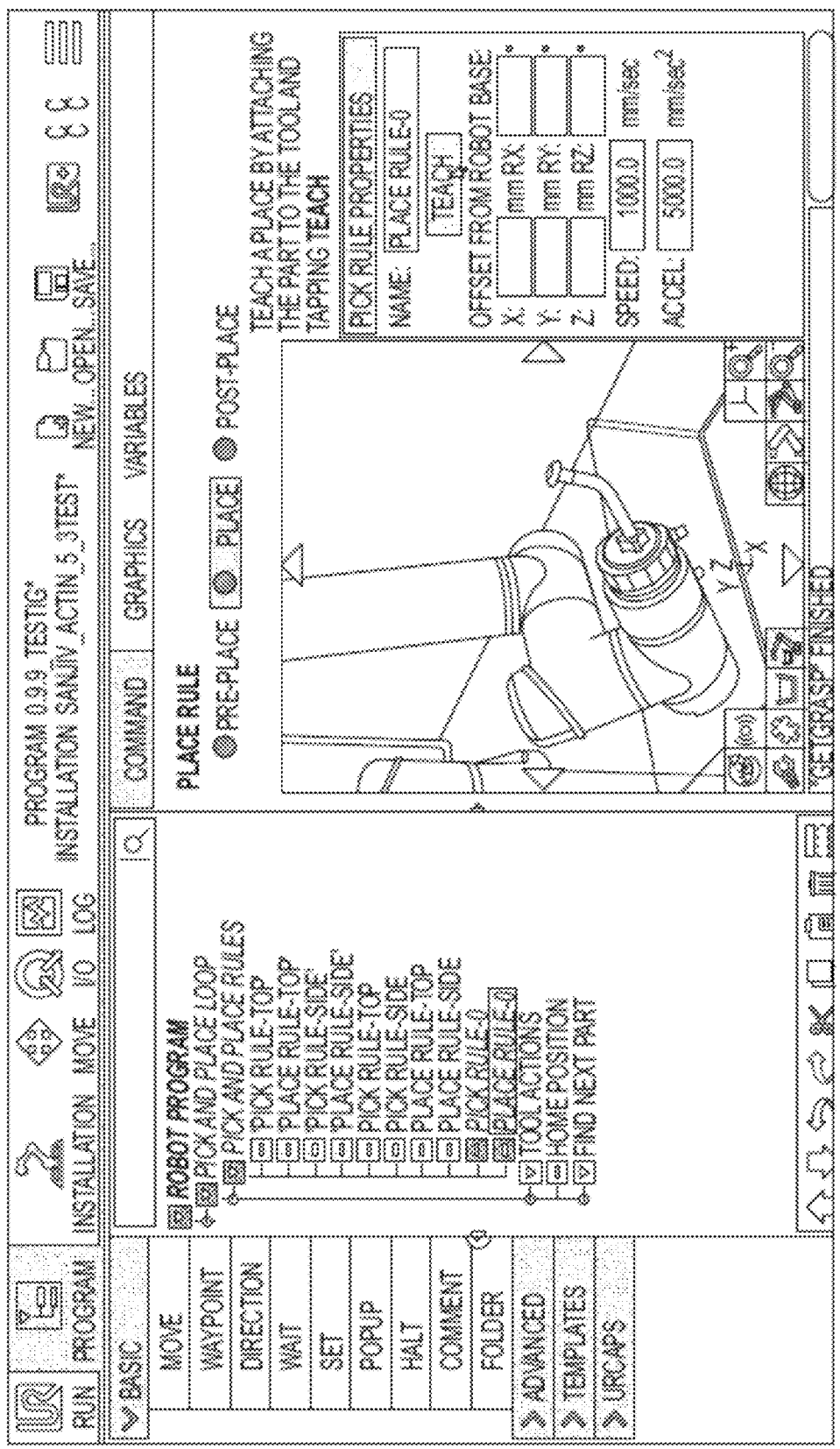
FIG. 21 is a graphical user interface that allows a user to set a place rule according to an embodiment of the present disclosure.
Figure 22:
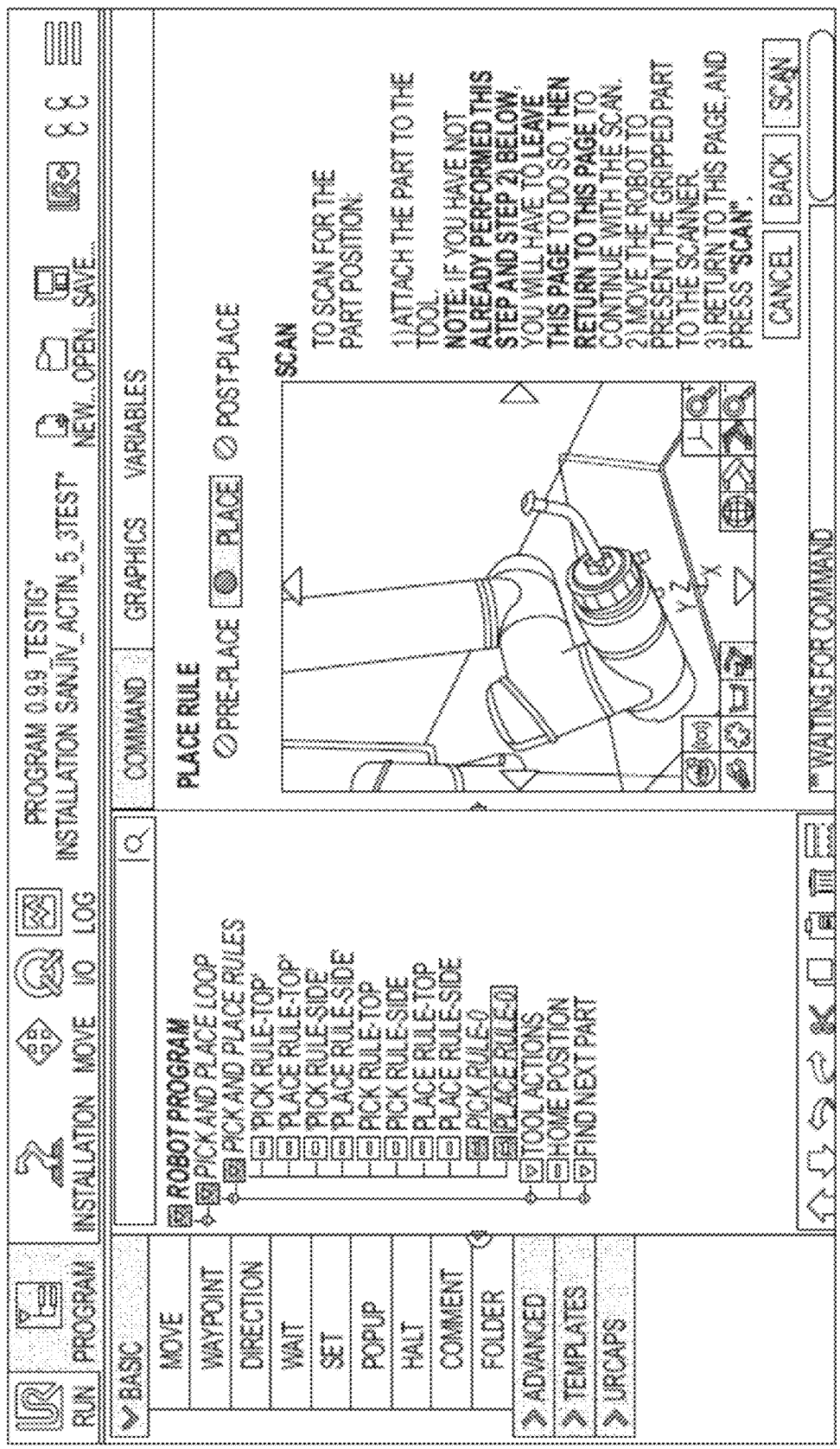
FIG. 22 is a graphical user interface that allows a user to set a place rule according to an embodiment of the present disclosure.
Figure 23:
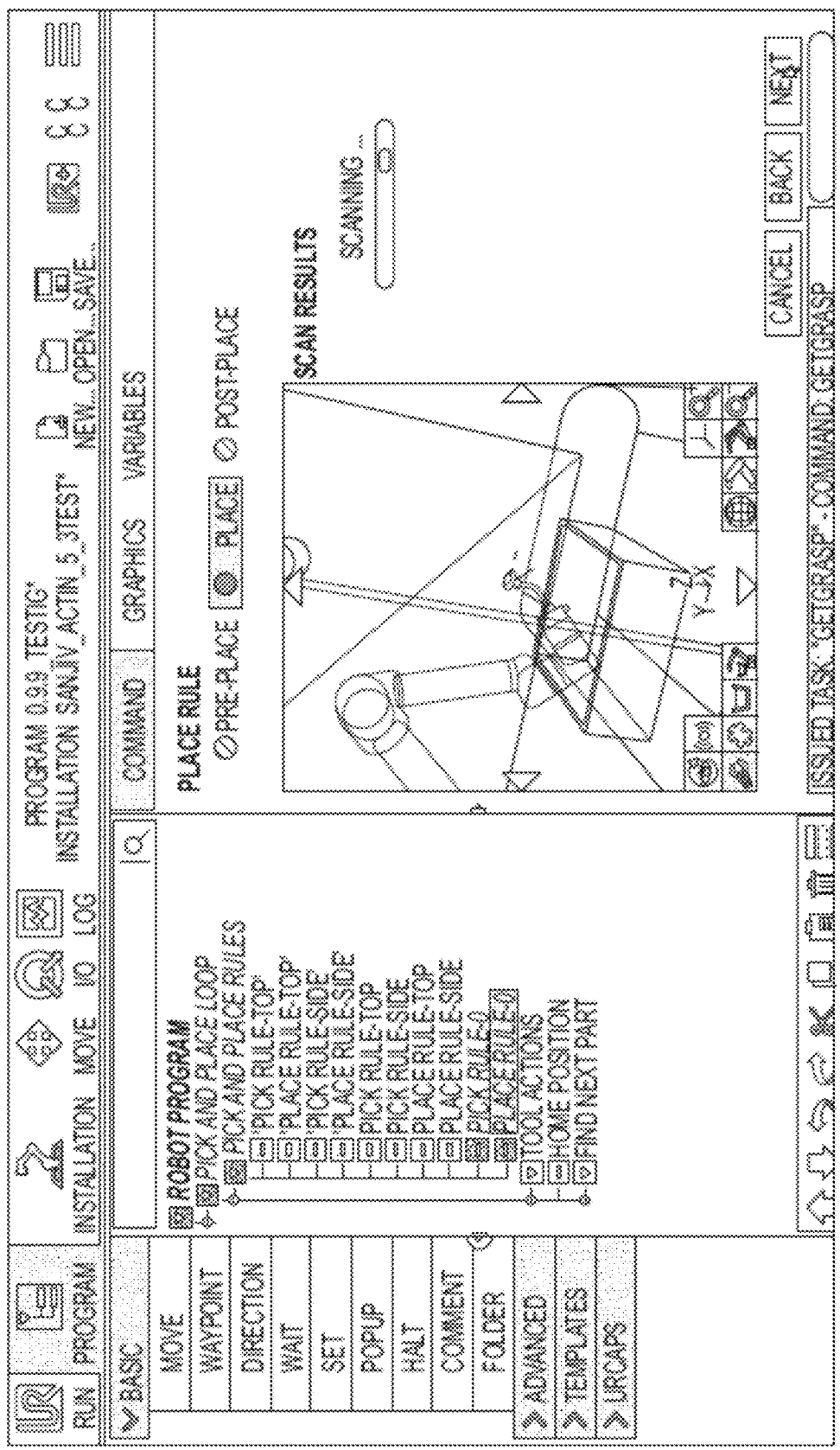
FIG. 23 is a graphical user interface that allows a user to set a place rule according to an embodiment of the present disclosure.

Referring now to FIGS. 21-25, example graphical user interfaces that may be used to in accordance with one or more place rules are provided. As shown in FIG. 21, a place rule may be taught by attaching the workpiece to the end effector and selecting the "teach" option from the graphical user interface. In order to prepare for the scan, the user may need to move the robot and/or end effector to present the workpiece and end effector to the scanner. In some cases the end effector may be controlled using one or more controls accessible through the graphical user interface, however, manual presentation is also within the scope of the present disclosure. Once the workpiece and end effector are visible to the scanner the scan may be initiated as shown in FIGS. 21-23.

Figure 24:
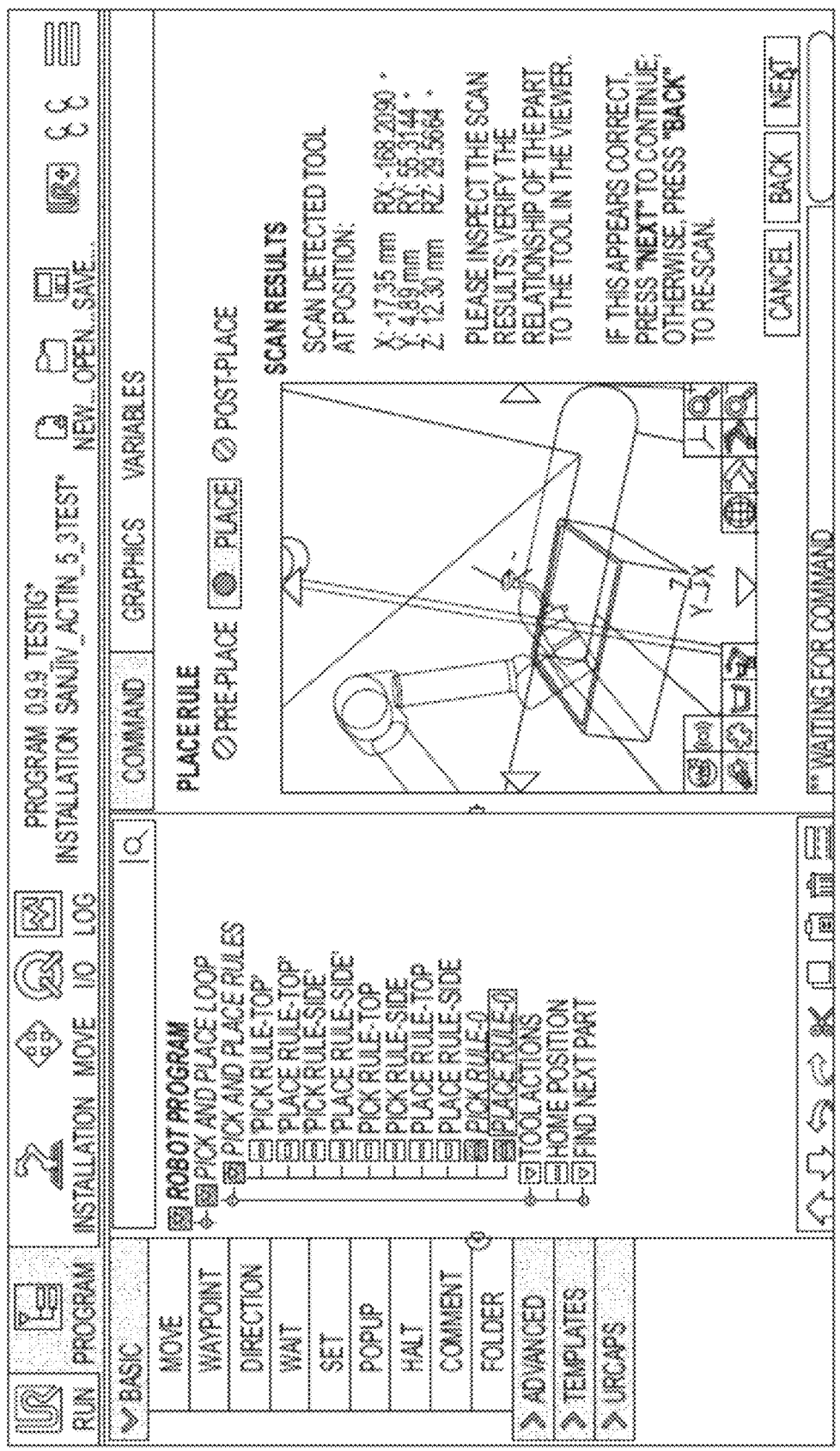
FIG. 24 is a graphical user interface that allows a user to set a place rule according to an embodiment of the present disclosure.
Figure 25:
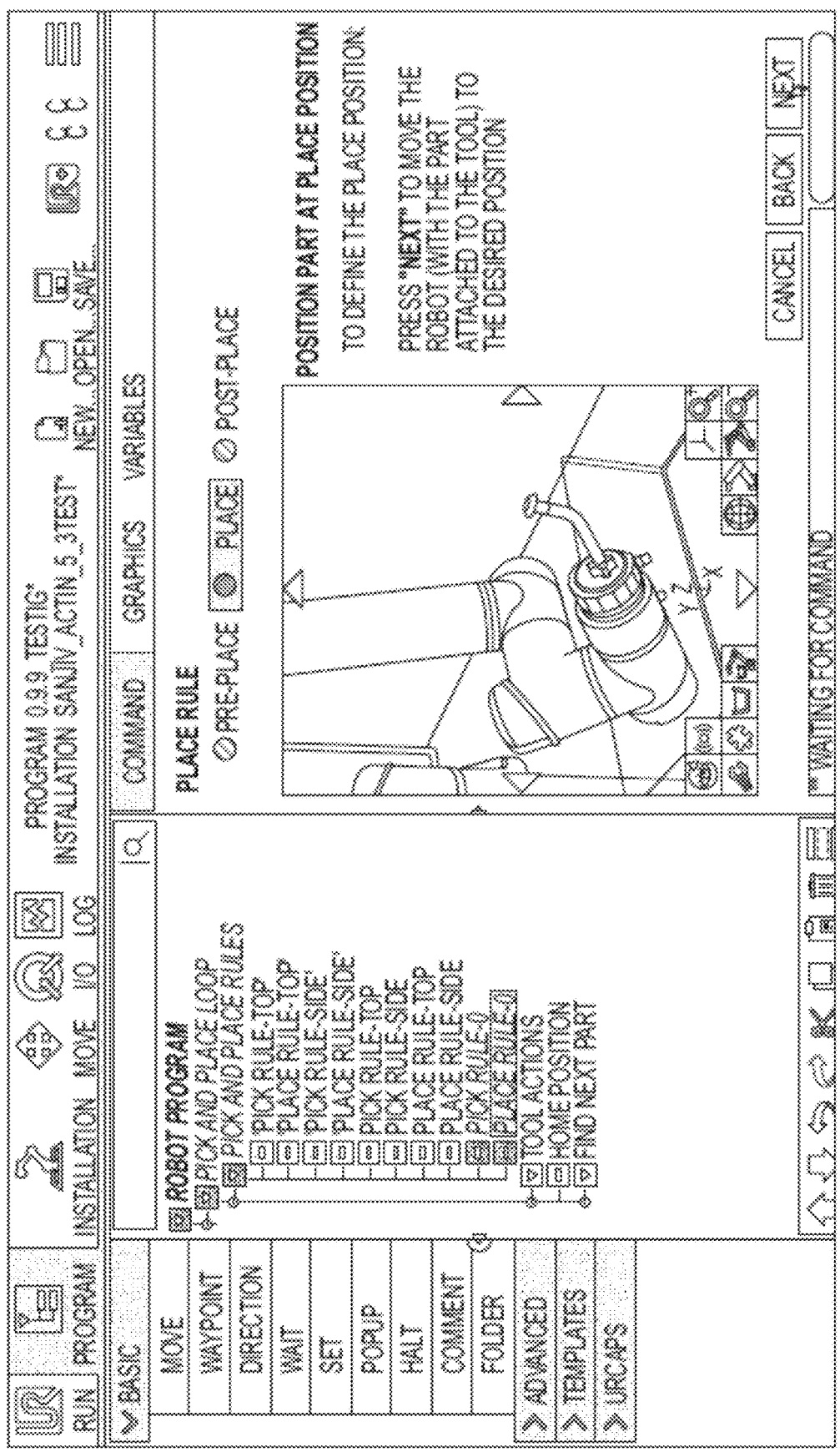
FIG. 25 is a graphical user interface that allows a user to set a place rule according to an embodiment of the present disclosure.
Figure 26:
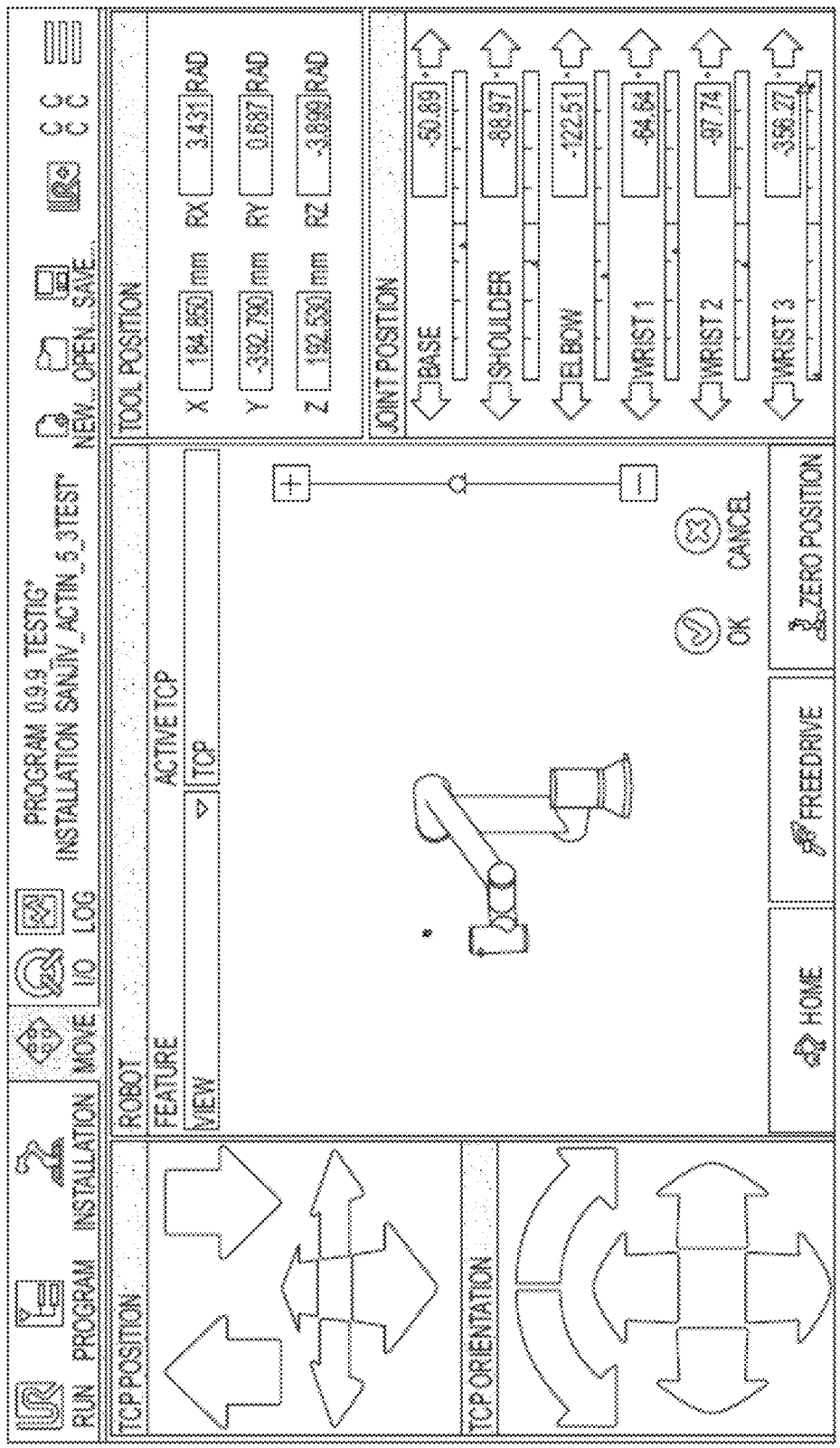
FIG. 26 is a graphical user interface according to an embodiment of the present disclosure.

Referring now to FIG. 24, an example graphical user interface showing scan results is provided. In this particular example, the scan results show the end effector position as well as the specific X, Y, and Z coordinates. Process 10 allows the user to verify the relationship of the workpiece and the end effector and also provides the ability to perform a re-scan if necessary. FIG. 25 shows an example graphical user interface where the user or system may define the desired placement position. In some embodiments, upon selection of the "next" option the end effector and workpiece may be moved to the desired placement position. FIG. 26 depicts a graphical user interface showing both tool position and joint position coordinates.

Embodiments of the present disclosure may allow for picks and places to be programmed not as a sequence, but starting with establishing the pose of the workpiece relative to the robot, and working forwards or backwards from that initial starting point. The relationship may be established by scanning the workpiece while it is held by the end effector. The end effector may be rigidly attached to the robot, so this may also establish the pose of the workpiece relative to the robot. The rest of the pick may be specified by specifying numerical offsets of the robot position relative to the established workpiece/robot pose. The rest of the place may be specified by reading the robot pose, inferring the workpiece pose from the robot pose, and specifying numerical offsets of the robot position relative to the established workpiece pose.

Accordingly, embodiments of robotic bin picking process 10 described herein may provide numerous advantages over existing approaches. For example, picks and places may be programmed and debugged independently, by starting with the scan every time. The relationship of the workpiece and the end effector may optimized before the scan, removing errors due to the part moving, suction cup deformation during a pick (or resilient pad deformation on a mechanical gripper), unwanted offsets, etc. The relationship of the workpiece and the end effector may be visually verified after the scan. This approach may be thought of as programming "from the middle out", working backwards to the pick, and forwards to the place. This cuts any error accumulation chains in half. Programming picks may not require moving the robot at all, reducing effort, and removing errors caused by human visual establishment of the robot position. Embodiments included herein may improve the accuracy of workpiece pose detection by presenting salient features, scanning in the optimal part of the scanned volume, scanning the workpiece in isolation from other workpieces or environmental clutter, etc.

In some embodiments, the placement training procedure may include the following steps: 1) Offline: teach the robot to pick up and present the workpiece to the sensor for scanning. Record both the end effector pose and the workpiece pose. 2) Offline: teach the robot to place the workpiece at its destination, record the end effector pose. 3) Online: pick the workpiece and present it to the sensor for scanning using the same robot posture as in Step 1, record the end effector pose and workpiece pose. 4) Online: Place the workpiece to its destination by the information collected in the previous steps.

In some embodiments, placement accuracy may be dominated by three primary sources: 1) Robot kinematic model calibration, 2) Sensor calibration and alignment, and 3) Workpiece pose estimation. These three tasks determine the coordinate system transformations that define the robot end-effector pose, sensor pose, and workpiece pose and in a common coordinate system. The final workpiece placement may be calculated as a function of these transformations.

In some embodiments and as discussed above, the GUI may be on any suitable device including, but not limited to, on a teach pendant, on a hand-held device, on a personal computer, on the robot itself, etc. In some embodiments, the GUI may draw its displayed information from multiple sources, for example from the robot controller and from a processor separate from the robot controller. In some embodiments, the GUI may direct user input to one or multiple destinations, for example to the robot controller and/or a processor separate from the robot controller. In some embodiments, the user of the GUI may or may not be aware of the existence of multiple data sources or destinations.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present disclosure.

What is claimed is:

1. A method of picking and placing workpieces, comprising:
    configuring a workcell with a scanner and a robot such that a first workpiece is presentable, by the robot and to the scanner, to be scanned by the scanner;
    determining a first pose, of the scanner and the robot, relative to each other;
    attaching the first workpiece to an end effector that is attached to the robot;
    moving the robot such that the first workpiece that is attached to the end effector is in position to be scanned by the scanner;
    scanning the workpiece with the scanner while the workpiece is attached to the end effector;
    determining a second pose, of the workpiece relative to the scanner, by a programmed computing device;
    determining a third pose, of the workpiece relative to the robot, based upon, at least in part, the first pose and the second pose;
    storing the third pose in a memory associated with the computing device; and
    picking and placing, via the robot, a second workpiece based upon, at least in part, the third pose, wherein the second workpiece is similar to the first workpiece.

2. The method of claim 1:
    wherein picking the second workpiece includes specifying a fourth pose, of the robot, based upon, at least in part, the third pose.

3. The method of claim 1,
    wherein placing the second workpiece includes determining a fourth pose, of the robot, and inferring a fifth pose, of the second workpiece in relation to a destination, from the fourth pose.

4. The method of claim 1,
    wherein placing the second workpiece includes specifying a fourth pose, of the robot, based upon, at least in part, the third pose.

5. The method of claim 1, further comprising:
    displaying, at a graphical user interface, the third pose to allow for visual verification.

6. The method of claim 1, wherein the scanning and the determining of the third pose occur while the robot is in a fixed position.

7. The method of claim 1, further comprising:
    allowing a user to adjust the third pose by entering one or more coordinates to create an adjusted third pose.

8. The method of claim 7, further comprising:
    displaying the adjusted third pose at a graphical user interface for verification.

9. A system for picking and placing workpieces, comprising:
    a scanner configured to create a scan of a first workpiece while the first workpiece is attached to an end effector;
    a robot with the end effector attached thereto, the robot configured to move such that the first workpiece, when attached to the end effector, is positionable to be scanned by a scanner;
    a workcell configured with the scanner and the robot such that the first workpiece is presentable, by the robot and to the scanner, to be scanned by the scanner;
    a computing device configured to:
        determine a first pose, of the scanner and the robot, relative to each other;
        determine a second pose, of the first workpiece relative to the robot, based upon, at least in part, the scan;
        determine a third pose, of the workpiece relative to the robot, based upon, at least in part, the first pose and the second pose; and
        store the third pose in a memory associated with the computing device; and
    wherein the robot is further configured to pick and place a second workpiece based upon, at least in part, the third pose, and the second workpiece is similar to the first workpiece.

10. The system of claim 9, wherein the robot is further configured to: specify a fourth pose of the robot based upon, at least in part, the third pose, to facilitate picking the second workpiece.

11. The system of claim 9, wherein the robot is further configured to: determine a fourth pose, of the robot; and infer a fifth pose, of the second workpiece in relation to a destination, from the fourth pose, to facilitate placing the second workpiece.

12. The system of claim 9, wherein the robot is further configured to: specify a fourth pose, of the robot, based upon, at least in part, the third pose, to facilitate placing the second workpiece.

13. The system of claim 9, wherein the computing device is further configured to: display, at a graphical user interface, the third pose to allow for visual verification.

14. The system of claim 13, wherein the graphical user interface is configured to allow a user to adjust the third pose by entering one or more coordinates to create an adjusted third pose.

15. The system of claim 14, wherein the graphical user interface is configured to display the adjusted third pose at the graphical user interface for verification.

16. The system of claim 9, wherein creating the scan and determining the third pose occur while the robot is in a fixed position.

* * * * *